(12) United States Patent
Yamasaki

(10) Patent No.: US 11,516,356 B2
(45) Date of Patent: Nov. 29, 2022

(54) IMAGE FORMING APPARATUS

(71) Applicant: CANON KABUSHIKI KAISHA, Tokyo (JP)

(72) Inventor: Shozo Yamasaki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/676,912

(22) Filed: Feb. 22, 2022

(65) Prior Publication Data

US 2022/0294917 A1 Sep. 15, 2022

(30) Foreign Application Priority Data

Mar. 12, 2021 (JP) .............................. JP2021-040341

(51) Int. Cl.
*H04N 1/00* (2006.01)
*G06F 3/12* (2006.01)

(52) U.S. Cl.
CPC ....... *H04N 1/00344* (2013.01); *G06F 3/1221* (2013.01); *G06F 3/1229* (2013.01); *H04N 1/00079* (2013.01); *H04N 1/00411* (2013.01); *H04N 1/00899* (2013.01)

(58) Field of Classification Search
CPC ........... H04N 1/00344; H04N 1/00079; H04N 1/00411; H04N 1/00899; G06F 3/1221; G06F 3/1229

USPC ........................................................ 358/1.15
See application file for complete search history.

(56) References Cited

U.S. PATENT DOCUMENTS

| | | | |
|---|---|---|---|
| 9,485,377 B2 * | 11/2016 | Utsunomiya | H04N 1/00896 |
| 2011/0219249 A1 * | 9/2011 | Kuwahara | G06F 1/00 713/323 |
| 2014/0036292 A1 * | 2/2014 | Higashi | H04N 1/00896 358/1.13 |
| 2015/0242166 A1 | 8/2015 | Itaya | |
| 2018/0160000 A1 * | 6/2018 | Takahashi | G06F 9/4843 |

* cited by examiner

*Primary Examiner* — Allen H Nguyen
(74) *Attorney, Agent, or Firm* — Rossi, Kimms & McDowell LLP

(57) ABSTRACT

In a normal mode that is a mode when a user performs a printing work, a wireless operation unit shifts to a second mode when the wireless operation unit is not operated for a first predetermined time in a first mode. In a maintenance mode when a repairman performs a maintenance work, the wireless operation unit does not shift to the second mode even if the wireless operation unit is not operated for the first predetermined time in the first mode. In addition, in the maintenance mode, if the remaining amount of a battery is equal to or greater than a predetermined amount in the first mode, the wireless operation unit does not shift to the second mode, and if the remaining amount of the battery is less than the predetermined amount, the wireless operation unit shifts to the second mode.

9 Claims, 15 Drawing Sheets

IMAGE FORMING APPARATUS

BACKGROUND OF THE INVENTION

Field of the Invention

The present invention relates to an image forming apparatus, such as an electrophotographic copying machine and an electrophotographic printer (for example, a laser beam printer and an LED printer).

Description of the Related Art

Conventionally, a technique using a remote operation portion capable of operating an image forming apparatus by wireless communication has been proposed. For example, in a large-scale multifunction device for commercial printing, an operation portion can be removed from the main body of the device so as to be remotely operated. This greatly improves efficiency in the workability of print settings, identification of the location of a paper jam, and the like.

For example, US2015/0242166 discloses an operation unit detachably attachable to the main body of the image forming apparatus. This operation unit can communicate with the main body of the image forming apparatus through wireless communication. In addition, this operation unit can take a power saving display state in which power consumption is suppressed.

Incidentally, the maintenance work of the image forming apparatus may be performed by a repairman. The repairman dispatched to the user performs maintenance of the image forming apparatus by using the operation unit of the image forming apparatus. The operation unit can display a screen for the repairman to perform maintenance work (the mode of the image forming apparatus at this time is referred to as a maintenance mode).

In the maintenance mode, when the operation unit is in a power saving display state, the maintenance screen for the repairman is not displayed. Therefore, in the maintenance mode, it is considered that the operation unit should be controlled so as not to take the power saving display state.

However, in general, an operation unit capable of performing wireless communication is assumed to be carried and is battery-powered. Therefore, in a configuration that does not take the power saving display state because the image forming apparatus is in the maintenance mode, there is a possibility that the battery will run out earlier than the user expected.

SUMMARY OF THE INVENTION

A typical configuration of the invention is
an image forming apparatus that operates in a normal mode for a user to perform a printing work and a maintenance mode for a repairman to perform a maintenance work, the image forming apparatus including:
an image forming unit configured to form an image on a sheet;
a wireless communication unit configured to perform wireless communication; and
a wireless operation unit configured to perform wireless communication with the wireless communication unit, operated to control the image forming apparatus, and including a key configured to input an instruction, a display configured to display information, and a battery configured to supply power for operating the wireless operation unit, the wireless operation unit shifting from a first mode, which is a state in which the display is ON, to a second mode, which is a state in which the display is OFF and in which less power is consumed than in the first mode,
wherein, in the normal mode, when the key is not operated for a first predetermined time in the first mode, the wireless operation unit shifts to the second mode, and in the maintenance mode, even if the key is not operated for the first predetermined time in the first mode, the wireless operation unit does not shift to the second mode,
wherein, in the maintenance mode, if a remaining amount of the battery is equal to or greater than a predetermined amount in the first mode, the wireless operation unit does not shift to the second mode regardless of a length of a period during which the key is not operated, and if the remaining amount of the battery is less than the predetermined amount, the wireless operation unit shifts to the second mode when the key is not operated for a second predetermined time not shorter than the first predetermined time, and
wherein the predetermined amount is larger than the remaining amount of the battery at which the wireless operation unit does not operate.

Further features of the present invention will become apparent from the following description of exemplary embodiments with reference to the attached drawings.

DESCRIPTION OF THE EMBODIMENTS

Hereinafter, exemplary embodiments of the invention will be illustratively described in detail with reference to the diagrams. However, the dimensions, materials, shapes, relative arrangements, and the like of components described below are not intended to limit the scope of the invention to those alone unless otherwise specified.

First Embodiment

<Image Forming Apparatus>

Figure 1:
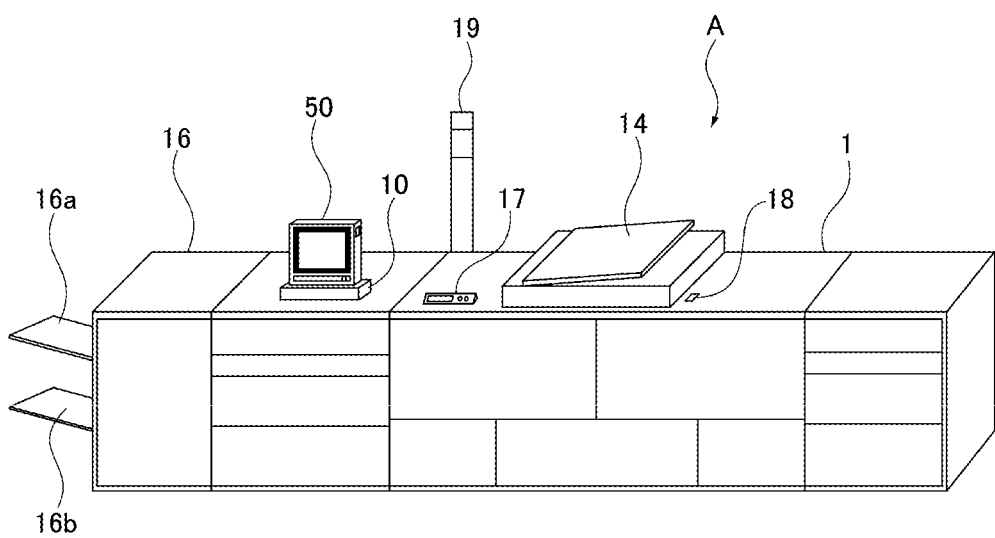
FIG. 1 is a schematic perspective view of an image forming system.

An image forming apparatus according to the present embodiment will be described with reference to FIG. 1. FIG. 1 is a schematic perspective view showing an example of an image forming system in which an image forming apparatus is provided.

As shown in FIG. 1, an image forming system A includes an image forming apparatus 1 for forming an image on a sheet S and a processing apparatus 16 for performing processing, such as staple processing, punching processing, and bookbinding processing, on the sheet S on which an image is formed by the image forming apparatus 1. In addition, a reader 14 that optically reads an image of an original placed on a glass surface (not shown) and converts the read image into image data is provided above the image forming apparatus 1.

The image forming apparatus 1 includes a seesaw type or tactile type main body power supply switch 18 for on/off switching of the main power supply. In addition, the image forming apparatus 1 includes a display panel 17 for displaying a lamp or an error code to notify the user of the state of the image forming apparatus, such as an image forming process being performed, stopped due to an error, or a standby state. In addition, the image forming apparatus 1 includes a tower type lamp 19 for notifying a user at a distant location of the state of the image forming apparatus by turning on and off or blinking the light source.

In addition, the image forming apparatus 1 includes a panel mounting portion 10 on which a wireless operation unit 50 (remote operation portion) is mounted so as to be detachably attachable. The wireless operation unit 50 will be described later.

Figure 2:
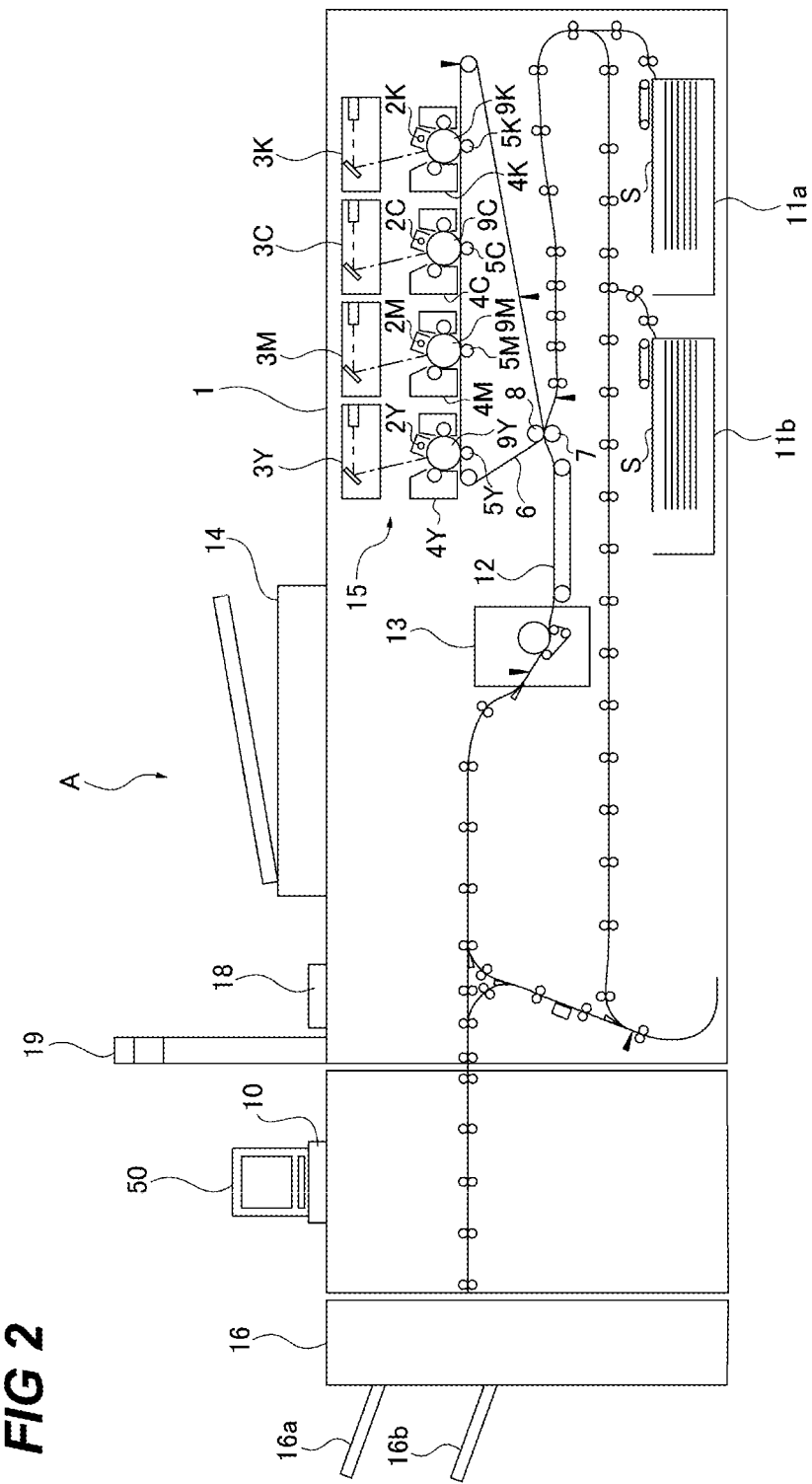
FIG. 2 is a schematic cross-sectional view of an image forming system.

As shown in FIG. 2, the image forming apparatus 1 includes an image forming portion (image forming unit) 15 that forms an image on the sheet S. The image forming portion 15 includes photosensitive drums 9Y, 9M, 9C, and 9K, charging devices 2Y, 2M, 2C, and 2K, and developing devices 4Y, 4M, 4C, and 4K. In addition, the image forming portion 15 includes primary transfer rollers 5Y, 5M, 5C, and 5K, laser scanner units 3Y, 3M, 3C, and 3K, an intermediate transfer belt 6, a secondary transfer roller 7, a secondary transfer counter roller 8, and the like.

Figure 4:
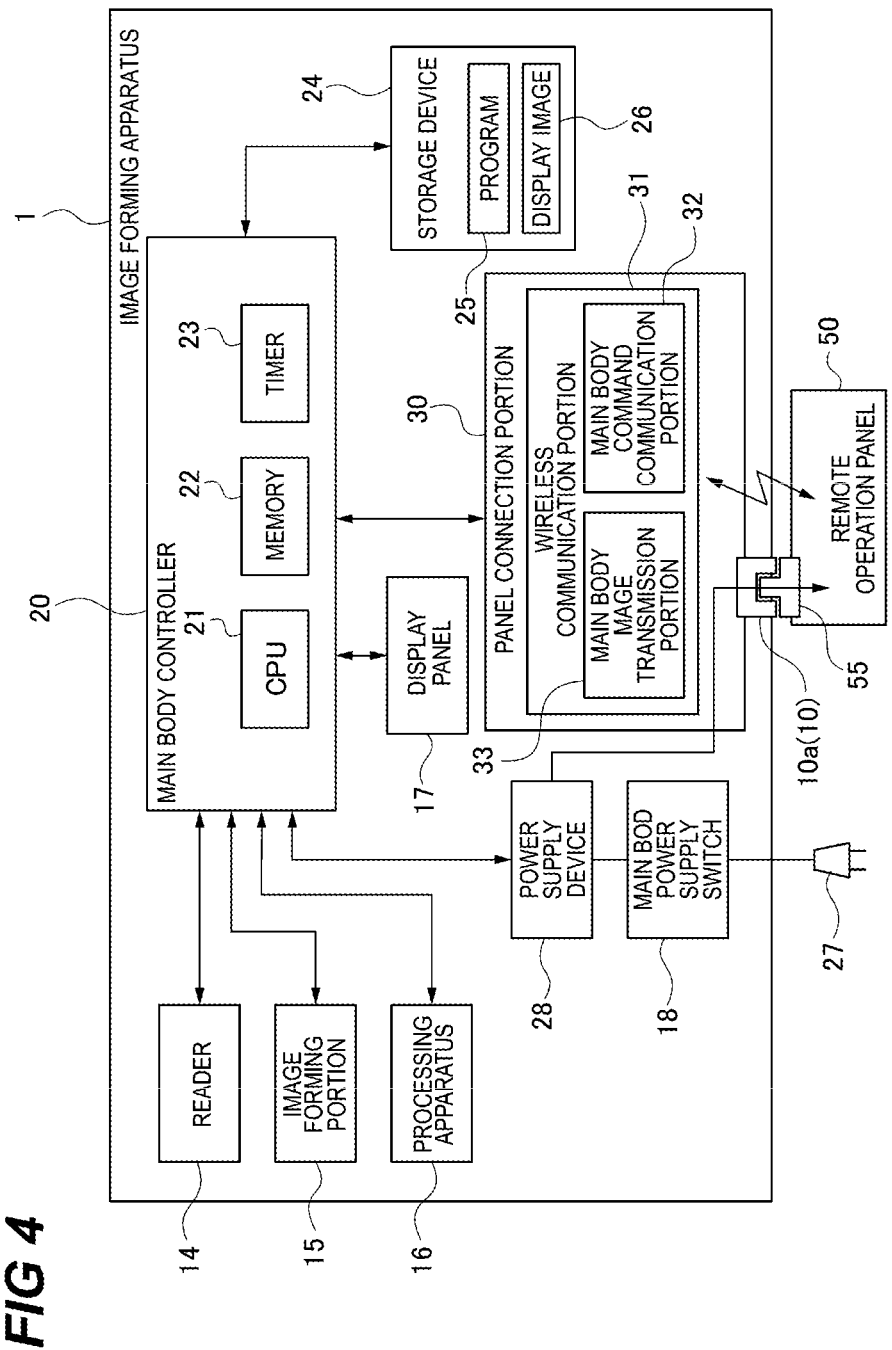
FIG. 4 is a block diagram showing the system configuration of an image forming apparatus.

When an image is formed by the image forming apparatus 1, an image forming job is first input to a controller 20 (see FIG. 4). Then, the sheet S housed in any of sheet cassettes 11a and 11b is sent to a secondary transfer portion formed by the secondary transfer roller 7 and the secondary transfer counter roller 8.

On the other hand, in the image forming portion 15, the surface of the photosensitive drum 9Y is first charged by the charging device 2Y. Then, the laser scanner unit 3Y emits laser light to the surface of the photosensitive drum 9Y according to the image data of the original read by the reader 14 or image data transmitted from an external device (not shown) through a network, and is photosensitive, so that an electrostatic latent image is formed on the surface of the photosensitive drum 9Y.

Then, yellow toner is made to adhere to the electrostatic latent image formed on the surface of the photosensitive drum 9Y by the developing device 4Y, so that a yellow toner image is formed on the surface of the photosensitive drum 9Y. The toner image formed on the surface of the photosensitive drum 9Y is primarily transferred to the intermediate transfer belt 6 by applying a primary transfer bias to the primary transfer roller 5Y.

By the same process, magenta, cyan, and black toner images are formed on the photosensitive drums 9M, 9C, and 9K, respectively. Then, by applying the primary transfer bias to the primary transfer rollers 5M, 5C, and 5K, these toner images are transferred so as to be superimposed on the yellow toner image on the intermediate transfer belt 6. As a result, a full-color toner image corresponding to the image signal is formed on the surface of the intermediate transfer belt 6.

Then, the intermediate transfer belt 6 rotates, so that a full-color toner image is transferred to the secondary transfer portion. Then, by applying the secondary transfer bias to the secondary transfer roller 7 in the secondary transfer portion, the full-color toner image on the intermediate transfer belt 6 is transferred to the sheet S. The sheet S to which the toner image has been transferred is conveyed to a fixing device 13 by a conveying belt 12. Then, the fixing device 13 heats and pressurizes the toner image to be fixed on the sheet S.

Then, the sheet S on which the toner image is fixed is sent to the processing apparatus 16. When the user designates processing such as staple processing, punching processing, and bookbinding processing, the sheet S sent to the processing apparatus 16 is discharged to a discharge tray 16a after being subjected to the designated processing. When the user does not designate processing, the sheet S sent to the processing apparatus 16 is discharged to a discharge tray 16b as it is without being processed.

<Wireless Operation Unit>

In addition, the image forming apparatus 1 includes the wireless operation unit 50 (remote operation portion) detachably attachable to the panel mounting portion 10 (mounting portion). The wireless operation unit 50 is connected to the image forming apparatus 1 by being mounted on the panel mounting portion 10. Specifically, when the wireless operation unit 50 is mounted on the panel mounting portion 10, a charging connector 55 (FIG. 3B) of the wireless operation unit 50 is electrically connected to a power supply connector 10a (FIG. 4) of the panel mounting portion 10. As a result, the connection of the wireless operation unit 50 is detected by the image forming apparatus 1, and a battery 67 (FIG. 5) of the wireless operation unit 50 is charged from the image forming apparatus 1. In addition, since the wireless operation unit 50 is connected to the image forming apparatus 1 by wireless communication and is not connected by a cable, the wireless operation unit 50 alone can be carried by the user as a single unit. In addition, since the wireless operation unit 50 can perform wireless communication with the image forming apparatus 1, the wireless operation unit 50 can be operated to control the image forming apparatus 1 at a location away from the image forming apparatus 1 (within a range in which wireless communication is possible) by being separated from the panel mounting portion 10. In addition, the wireless operation unit 50 can operate a connected device such as the processing apparatus 16 connected to the image forming apparatus 1.

In addition, the wireless operation unit 50 is not limited to the configuration in which the wireless operation unit 50 is detachably attachable to the image forming apparatus 1, and may be configured independently of the image forming apparatus 1.

Figure 3A:
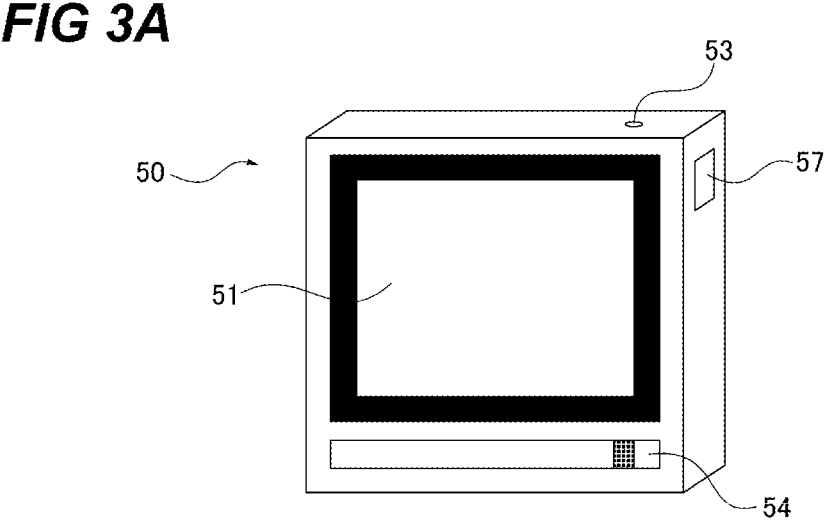
FIGS. 3A and 3B are explanatory diagrams of a wireless operation unit.
Figure 3B:
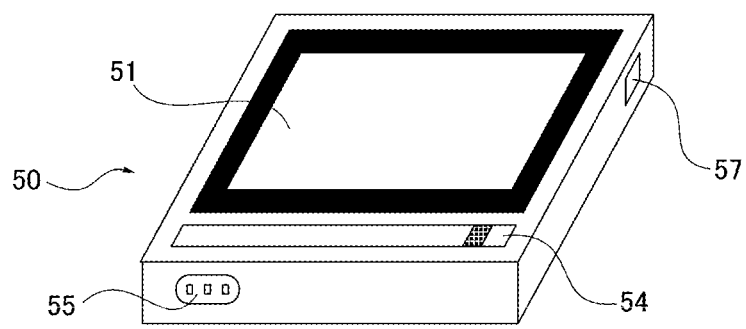

FIGS. 3A and 3B are schematic perspective views of the wireless operation unit 50. As shown in FIGS. 3A and 3B, the wireless operation unit 50 includes a speaker portion 53 for outputting sound, a state display portion 54 for providing notification of the state of the wireless operation unit 50 by being turned on and off or blinking, and a switch portion 56 for on/off switching of the power of the wireless operation unit 50. Here, the state display portion 54 is an LED, but is not limited to this configuration.

In addition, the wireless operation unit 50 includes a touch panel type display 51 in which a display portion capable of displaying a display image received from the image forming apparatus 1 and an operation portion (touch panel 52 in FIG. 5) for detecting a touch operation from the user are integrated. By performing an input operation by touching the display image displayed on the display 51 with a finger, the user can perform settings relevant to image formation, such as the number of sheets on which images are to be formed and the setting of the size of the sheet S, and settings relevant to image reading, such as the setting of the size of the original.

<System Configuration of Image Forming Apparatus>

Next, the system configuration of the image forming apparatus 1 will be described with reference to FIG. 4. FIG. 4 is a block diagram showing an example of the system configuration of the image forming apparatus 1.

As shown in FIG. 4, the image forming apparatus 1 includes the controller 20 having a CPU 21, a memory 22, and a timer 23. A storage device 24, the reader 14, the image forming portion 15, the processing apparatus 16, the display panel 17, and the like are connected to the controller 20. The controller 20 (CPU 21) controls the operation of each connected portion.

The reader 14 reads the original to generate image data. The image forming portion 15 performs an image forming process for forming an image on a sheet based on the image data. The processing apparatus 16 performs processing such as stapling processing, punching processing, and bookbinding processing on a printed material, such as a sheet on which the image forming process has been performed.

The storage device 24 stores various programs 25 or various display images 26 relevant to the control of the image forming apparatus 1. Here, the various programs 25 stored in the storage device 24 are a software group that is made to function by the controller 20 to perform various processes. In addition, the various display images (image data) stored in the storage device 24 are display images, print data, and the like to be displayed on the wireless operation unit 50. The display images to be displayed on the wireless operation unit 50, which will be described later, include display images shown in FIGS. 8A, 8B, 8C, 9A, 9B, 11A, and 11B.

The CPU 21 reads and executes the program 25 stored in the storage device 24. In addition, the CPU 21 reads a display image for display on the wireless operation unit 50 from the storage device 24 and transmits the display image to the wireless operation unit 50. The memory 22 temporarily stores data associated with the execution of the program 25 by the CPU 21. That is, the CPU 21 executes processing such as forming an image on the sheet by controlling the reader 14, the image forming portion 15, the processing apparatus 16, and the like connected to the controller 20 while using the memory 22 as a work area based on the program 25 stored in the storage device 24. For example, the CPU 21 executes image processing on the image data read from the original by the reader 14 based on the program 25. The CPU 21 stores the image data generated in this manner in the storage device 24, and transmits the image data to the image forming portion 15 to execute the image forming process. In addition, the CPU 21 is a controller that controls whether or not to allow the wireless operation unit 50 to shift to the power saving mode (second mode) in the maintenance mode or a mode when an error is detected, which will be described later. The above-described control by the CPU 21 will be described later with reference to FIG. 10.

The timer 23 is for measuring the time when the controller 20 performs various processes. For example, the controller 20 determines to shift the image forming apparatus 1 from the normal mode to the power saving mode, in which less power is consumed than in the normal mode, when the count value of the timer 23 exceeds a predetermined value after the start of a period during which the wireless operation unit 50 is not operated.

In addition, a panel connection portion 30 for making a connection with the wireless operation unit 50 is connected to the controller 20. The panel connection portion 30 includes a wireless communication portion (wireless communication unit) 31 for performing wireless communication between the panel mounting portion 10, which has the power supply connector 10a and to which the wireless operation unit 50 is connected, and the wireless operation unit 50. The charging connector 55 of the wireless operation unit 50 is connected to the power supply connector 10a of the panel mounting portion 10. The controller 20 can detect that the power supply connector 10a of the panel mounting portion 10 is connected to the charging connector 55 of the wireless operation unit 50. When the controller 20 detects the connection, power is supplied from a power supply device 28, which will be described later, to the wireless operation unit 50 through the connection between the power supply connector 10a and the charging connector 55.

The wireless communication portion 31 includes a main body command communication portion 32 and a main body image transmission portion 33. The CPU 21 reads the display image 26 stored in the storage device 24 and transmits the display image 26 to the wireless operation unit 50 through the main body image transmission portion 33 of the wireless communication portion 31. In addition, the CPU 21 generates an instruction to the wireless operation unit 50 and transmits the instruction to the wireless operation unit 50 through the main body command communication portion 32. Specifically, the CPU 21 wirelessly transmits commands for display instructions for various screens, notification of a state such as a job operation or error occurrence, and control of the shift of the wireless operation unit 50 to the power saving mode, which will be described later, to the wireless operation unit 50 through the main body command communication portion 32. In addition, the CPU 21 receives the notification or instruction generated by the wireless operation unit 50 through the main body command communication portion 32. In the present embodiment, the main body command communication portion 32 and the main body image transmission portion 33 are separately configured. However, the main body command communication portion 32 and the main body image transmission portion 33 may be combined into one communication line.

In addition, the power supply device 28 is connected to the controller 20. The power supply device 28 receives power from a commercial power supply through an outlet plug 27, converts the received power into power used by each device, and supplies the power to each device. Specifically, first, the power supply device 28 supplies power to the controller 20 when the main body power supply switch 18 is switched from off to on. Then, based on the instruction from the controller 20, the power supply device 28 supplies power to the reader 14, the image forming portion 15, the processing apparatus 16, the display panel 17, the wireless operation unit 50 mounted on the panel mounting portion 10, the wireless communication portion 31, the storage device 24, and the like.

In addition, when the main body power supply switch 18 is turned off, the power supply device 28 stops the supply of power based on the instruction from the controller 20 (CPU 21). In addition, even if the main body power supply switch 18 is not turned off, the power supply device 28 can turn off the main body power supply switch 18 by stopping the supply of power based on the instruction from the controller 20 (CPU 21). The case where the main body power supply switch 18 is turned off based on the instruction from the controller 20 (CPU 21) is, for example, when an abnormality occurs or when an instruction to turn off the power is received from the user. In this manner, the controller 20 can switch the supply of power on and off for each device.

<System Configuration of Wireless Operation Unit>

Figure 5:
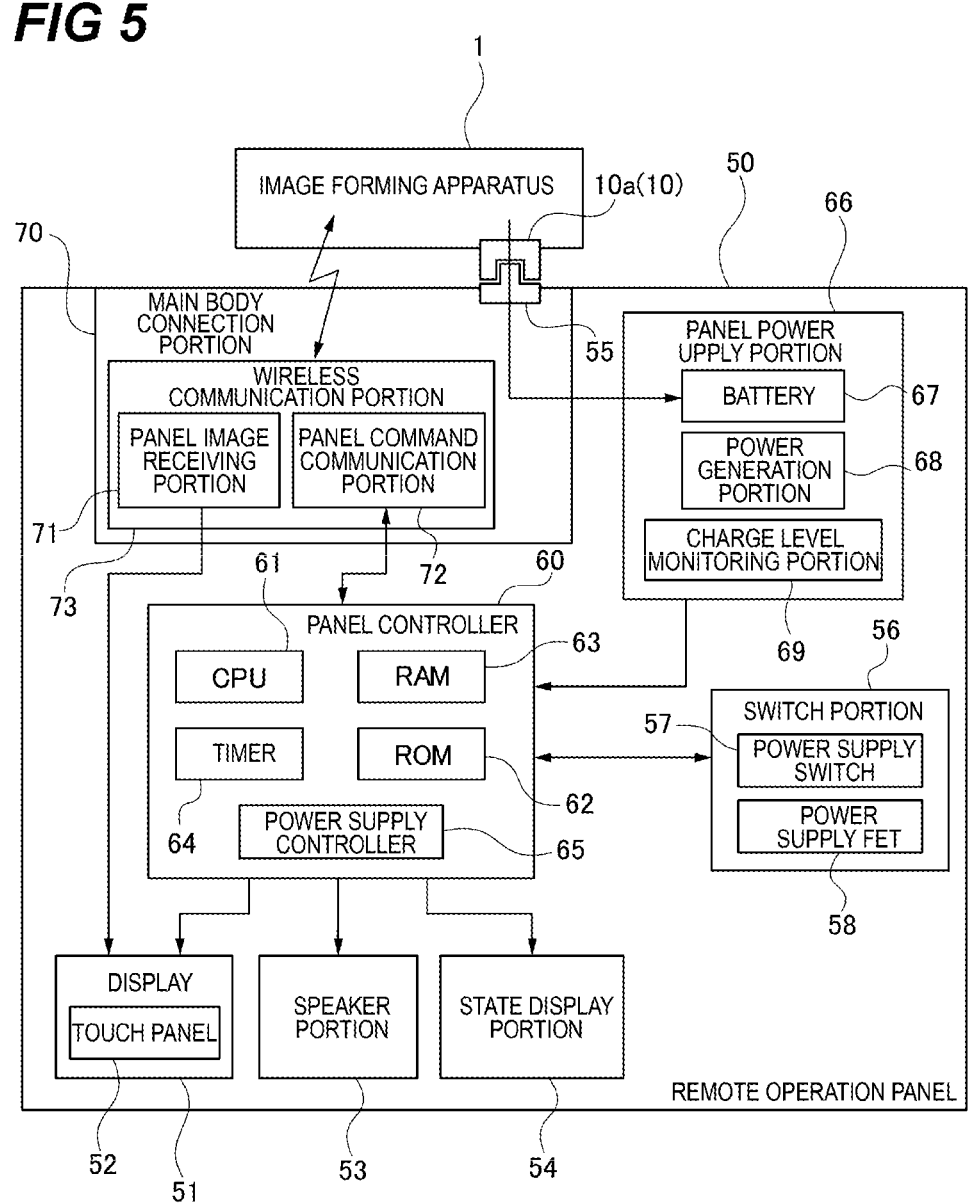
FIG. 5 is a block diagram showing the system configuration of a wireless operation unit.

Next, the system configuration of the wireless operation unit 50 will be described with reference to FIG. 5. FIG. 5 is a block diagram showing the system configuration of the wireless operation unit 50.

As shown in FIG. 5, the wireless operation unit 50 includes a panel controller 60 (power controller) having a CPU 61, a ROM 62, a RAM 63, a timer 64, and a power supply controller 65. As will be described later, the wireless operation unit 50 can shift to a normal mode, which is a first mode, or a power saving mode, which is a second mode in which less power is consumed than in the normal mode. After the start of a period during which the wireless operation unit 50 is not operated, the wireless operation unit 50 shifts from the normal mode to the power saving mode when the count value of the timer 64 exceeds the predetermined value. Here, the normal mode is the first mode in which the power of the battery 67 is supplied to the display 51 (display portion), and is a state in which the display 51 is ON. The power saving mode is the second mode in which the supply of power of the battery 67 to the display 51 is restricted, and is a state in which the display 51 is OFF.

The ROM 62 stores programs used for the control of the CPU 61 or settings relevant to the control. The CPU 61 performs various kinds of calculation processing based on the programs stored in the ROM 62. The RAM 63 temporarily stores data associated with the execution of a program by the CPU 61. That is, the CPU 61 controls the display 51, the speaker portion 53, the state display portion 54, the switch portion 56, and the like connected to the panel controller 60 while using the RAM 63 as a work area based on the program stored in the ROM 62. Specifically, based on the program stored in the ROM 62 or the instruction received from the CPU 21 of the image forming apparatus 1, the CPU 61 performs control to display the display image transmitted from the storage device 24 on the display 51 or control to output sound from the speaker portion 53.

In addition, the ROM 62 is a setting storage portion that stores the setting relevant to the above-described control, and as an example of the setting, a setting (setting value of the setting flag) regarding whether or not to shift the wireless operation unit 50 to the power saving mode is stored. For example, the CPU 61 shifts the wireless operation unit 50 to the power saving mode when the setting value of the setting flag stored in the ROM 62 is "1", and does not shift the wireless operation unit 50 to the power saving mode when the setting value of the setting flag stored in the ROM 62 is "0". This setting flag is set by transmitting a command to a panel command communication portion 72 according to an instruction from the CPU 21 of the image forming apparatus 1. The CPU 21 (controller) can control whether or not to allow the wireless operation unit 50 to shift to the power saving mode by changing the setting value of the setting flag stored in the ROM 62. In addition, the CPU 21 can read the setting value of the setting flag stored in the ROM 62 by transmitting the command to the panel command communication portion 72.

The timer 64 counts the time when the controller 20 performs various processes. The timer 64 is used when counting the time until the CPU 61 shifts the wireless operation unit 50 to the power saving mode. Specifically, the wireless operation unit 50 shifts the wireless operation unit 50 from the normal mode to the power saving mode when a predetermined time (first predetermined time) passes after the wireless operation unit 50 is no longer operated. The timer 64 measures a predetermined time (first predetermined time) at this time. In other words, the timer 64 counts a period during which the wireless operation unit 50 is not operated.

The wireless operation unit 50 includes the switch portion 56. The switch portion 56 has a power supply switch 57 and a power supply FET 58, and is connected to the panel controller 60. The power supply controller 65 constantly monitors the state of the power supply switch 57 in the switch portion 56, and switches the power supply FET 58 of the switch portion 56 on and off according to the on/off switching operation of the power supply switch 57. That is, the power supply controller 65 turns on and off the power of the wireless operation unit 50 according to the on/off switching operation of the power supply switch 57.

The wireless operation unit 50 includes a panel power supply portion 66. The panel power supply portion 66 has the battery 67, a power generation portion 68, and a charge level monitoring portion 69, and is connected to the panel controller 60. The battery 67 is the main power supply of the wireless operation unit 50, and is a rechargeable secondary battery. When the charging connector 55 of the wireless operation unit 50 is connected to the power supply connector 10a of the image forming apparatus 1, power is supplied from the power supply device 28 of the image forming apparatus 1 to the battery 67 so that the battery 67 is charged. The power generation portion 68 adjusts the voltage of the battery 67 to a voltage that can be used in each of the above-described components included in the wireless operation unit 50. The charge level monitoring portion 69 provides notification to the CPU 61 when the battery 67 falls below a predetermined charge level. As will be described later, the CPU 61 shifts the wireless operation unit 50 to the power saving mode when the charge level of the battery 67 falls below a predetermined amount. In addition, when the power supply connector 10a and the charging connector 55 are connected to each other, the CPU 61 can detect the connection.

In addition, the "predetermined amount" referred to herein is an amount larger than the charge level of the battery 67, which is the operating load of the wireless operation unit 50. That is, the user can operate the wireless operation unit 50 even if the charge level of the battery 67 is the same as the predetermined amount.

In the present embodiment, when the battery 67 falls below the predetermined charge level (predetermined amount), the wireless operation unit 50 immediately shifts to the power saving mode. However, the invention is not limited to this.

For example, the timer 64 may measure a period during which the wireless operation unit 50 is not operated after the battery 67 falls below the predetermined charge level, and the wireless operation unit 50 may shift to the power saving mode when the measured period exceeds a predetermined time (second predetermined time). In addition, the timer 64 may temporarily stop counting when the first predetermined time has passed from the start of the period during which the wireless operation unit 50 is not operated. In this case, the counting is restarted with the time when the remaining amount of the battery 67 falls below a predetermined charge level as a trigger.

In addition, the second predetermined time may be the same as the first predetermined time, or may be longer than the first predetermined time. By making the second predetermined time longer than the first predetermined time, it is possible to prevent the maintenance screen in the service mode from being blocked by shifting to the power saving mode. Therefore, it is expected that the workability of a repairman will be improved.

In addition, the wireless operation unit 50 includes a main body connection portion 70 for making a connection with the image forming apparatus 1. The main body connection portion 70 includes a wireless communication portion 71 for wireless communication between the charging connector 55, which is connected to the power supply connector 10a of the image forming apparatus 1, and the image forming apparatus 1.

The wireless communication portion 71 has the panel command communication portion 72 connected to the CPU 61 and a panel image receiving portion 73 connected to the display 51. The CPU 61 generates an instruction or notification for the image forming apparatus 1 and transmits the instruction or notification to the main body command communication portion 32 of the image forming apparatus 1 through an antenna (not shown) of the panel command communication portion 72. In addition, the CPU 61 receives an instruction or information transmitted from the main body command communication portion 32 of the image forming apparatus 1 through the panel command communication portion 72. Specifically, the main body command communication portion 32 wirelessly receives display instructions for various screens and notification of a state, such as a job operation or error occurrence, from the CPU 21, and converts these into wired electric signals to provide notification to the CPU 61. In addition, the main body command communication portion 32 wirelessly transmits information of which the image forming apparatus 1 is to be notified, such as touch panel input information from the CPU 61.

The panel image receiving portion 73 receives image data transmitted from the main body image transmission portion 33 of the image forming apparatus 1 through an antenna (not shown) and converts the image data into image data to be displayed on the display 51. In the present embodiment, the main body connection portion 70 is configured to include the panel command communication portion 72 and the panel image receiving portion 73. However, the panel command communication portion 72 and the panel image receiving portion 73 may be combined into one communication line.

In addition, the wireless communication portion 71 performs wireless communication through the wireless communication portion 31 of the image forming apparatus 1 by using Wi-Fi direct communication, which is a communication form in which the image forming apparatus 1 and the wireless operation unit 50 are directly connected to each other. Miracast, which is a display transmission technology to which the Wi-Fi direct communication method is applied, is used in, for example, mobile phones, displays, and projectors. In addition, the communication form for directly connecting the image forming apparatus 1 and the wireless operation unit 50 to each other may be other wireless communication methods, such as Bluetooth or NFC, instead of the wireless communication using Wi-Fi.

The display 51 is a display portion capable of displaying information stored in the ROM 62 (setting storage portion) or information received from the image forming apparatus 1 through the wireless communication portion 71. Therefore, as an image to be output to the display 51, an image received from the image forming apparatus 1 through the wireless communication portion 71 is output.

In addition, the display 51 is a touch panel type display (operation display portion) in which the above-described display portion and the touch panel 52, which is an operation portion for detecting a touch operation from the user, are integrated. The touch panel 52 is disposed on the display 51 so as to overlap each other, and the user operates the display 51 by touching the display 51 through the touch panel 52 with a finger. The display 51 displays a screen for the user through the touch panel 52.

Figure 7:
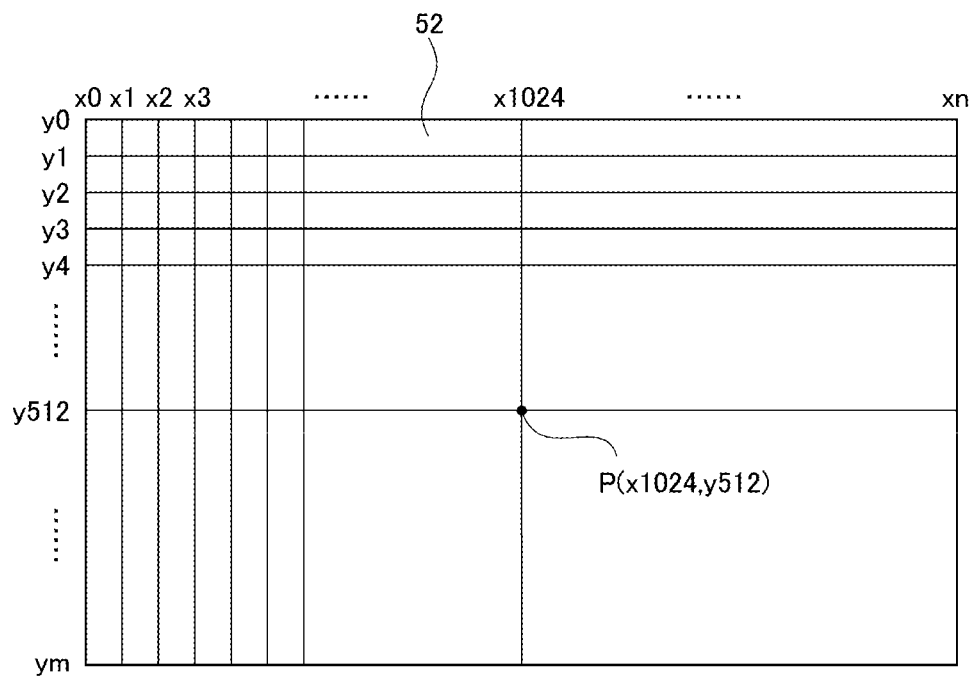
FIG. 7 is a diagram describing coordinate detection of a touch panel of a wireless operation unit.

Here, when the user operates the touch panel 52, the CPU 61 of the wireless operation unit 50 transmits the operation information of the touch panel 52 to the image forming apparatus 1 as coordinate information. This will be described below. FIG. 7 is a diagram in which coordinates are displayed on the touch panel 52 of the wireless operation unit 50. As shown in FIG. 7, the touch panel 52 is divided into n portions in the X direction and m portions in the Y direction. The number of divisions depends on the touch panel method or the like. In the resistance type touch panel of the present embodiment, the number of divisions in the X direction is 2048 and the number of divisions in the Y direction is 1024.

The coordinates are represented by (X, Y) according to the distance from the origin with the origin (0, 0) as a reference. For example, a position P shown in FIG. 7 is represented as coordinates (1024, 512) because this is located at a position away from the origin by 1024 in the X direction and 512 in the Y direction. The coordinate data is transmitted from the touch panel 52 (see FIG. 5) to the CPU 61 of the wireless operation unit 50, and is transmitted from the panel command communication portion 72 to the image forming apparatus 1 according to the instruction from the CPU 61. In the present embodiment, the communication between the image forming apparatus 1 and the wireless operation unit 50 is performed in an 8-bit length. Therefore, the numerical value of the coordinate data is divided into ⅛ to transmit the coordinate data. That is, when the coordinates are (1024, 512), the coordinates are replaced with (128, 64) and transmitted.

<Power Supply System of Wireless Operation Unit>

Figure 6:
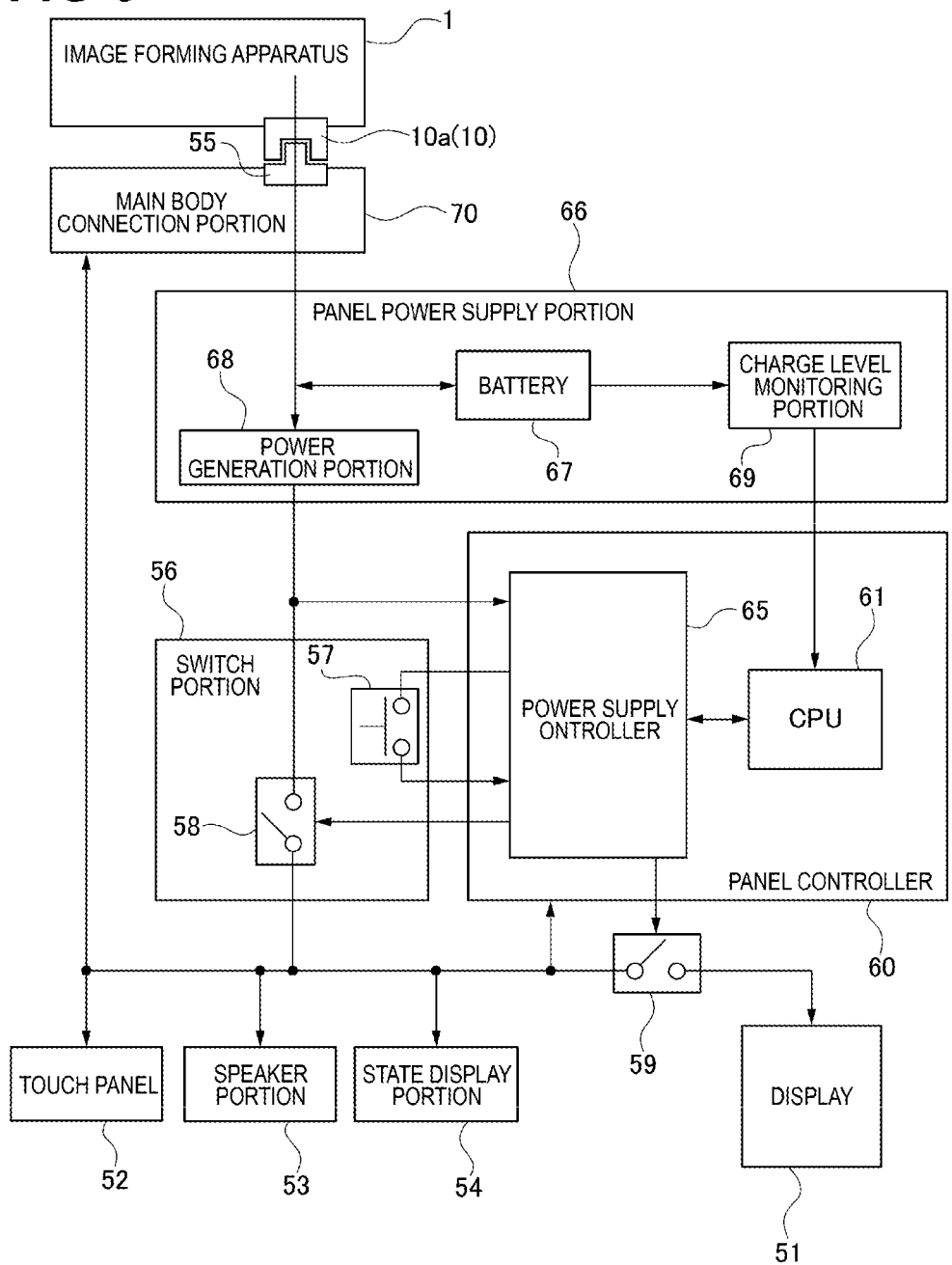
FIG. 6 is a block diagram showing a power supply system relevant to a wireless operation unit.

FIG. 6 is a block diagram relevant to the power supply system of the wireless operation unit 50 described with reference to FIG. 5. As shown in FIG. 6, the output power of the battery 67, which is the main power supply of the wireless operation unit 50, is supplied to the power generation portion 68 and is output after being adjusted to a voltage, which is used in each of the above-described components included in the wireless operation unit 50, by the power generation portion 68. In addition, when the charging connector 55 of the wireless operation unit 50 is connected to the power supply connector 10a of the image forming apparatus 1, the battery 67 is charged from the image forming apparatus 1, and the image forming apparatus 1 serves as a main power supply to supply power to the power generation portion 68.

The power output from the power generation portion 68 is supplied to the power supply FET 58 of the switch portion 56 and the power supply controller 65. That is, power is always supplied to the power supply controller 65. The power supply controller 65 monitors the output of the power supply FET 58, and switches the power supply FET 58 on and off according to the switching operation of the power supply switch 57.

When the power supply FET 58 is turned on, the voltage adjusted and output by the power generation portion 68 is supplied to the main body connection portion 70, the touch panel 52, the display 51, the speaker portion 53, and the state display portion 54 of the wireless operation unit 50. However, a switch 59 is provided on the line for the supply of power to the display 51. The CPU 61 controls on/off of the switch 59 through the power supply controller 65 to control the supply of power to the display 51. This is to maintain the driving of the wireless operation unit 50 by the battery 67 as long as possible. Specifically, the power for driving the display 51 is about 90% of the power consumed in the wireless operation unit 50. For this reason, a power saving mode for restricting the supply of power to the display 51 is provided. In the power saving mode of the wireless operation unit 50, less power is consumed than in the normal mode in which power is supplied to the display 51. Therefore, the CPU 61 determines when it is not necessary to display the screen on the display 51, and performs control for shifting to the power saving mode by turning off the switch 59. In other words, "restricting the supply of power" referred to herein means not only completely eliminating the supply of power from the battery 67 to the display 51 but also supplying less power than in the normal mode. In addition, the control to shift the power mode of the wireless operation unit 50 by the CPU 61 is performed according to the settings stored in the ROM 62. In addition, the charge level monitoring portion 69 detects the charge level of the battery 67 from the output voltage of the battery 67, and provides notification to the CPU 61 when the charge level of the battery 67 falls below a predetermined amount.

<Operation Mode of Image Forming Apparatus>

The image forming apparatus 1 according to the present embodiment has the following two operation modes.

The first operation mode is an operation mode for the user to operate the image forming apparatus 1 in order to use a copy function, a print function, a scanner function, and a facsimile function. Hereinafter, the first operation mode is referred to as a "normal mode".

The second operation mode is a "maintenance mode" in which a repairman uses the image forming apparatus 1. The "maintenance mode" is a mode for the repairman to perform maintenance work. The maintenance mode is a mode for adjusting the color tone of the output image. The maintenance work is, for example, a work to check or change the parameter settings when image distortion or color shift occurs. In addition, executing an adjustment print job to print a test pattern for image adjustment is also included in the maintenance work. In addition, the maintenance work includes checking counter information for counting the number of printed materials or the version of the firmware or software of the image forming apparatus 1.

The image forming apparatus 1 operates in any of the above-described operation modes, but the operation screens displayed on the wireless operation unit 50 in the respective operation modes are different.

Figure 8A:
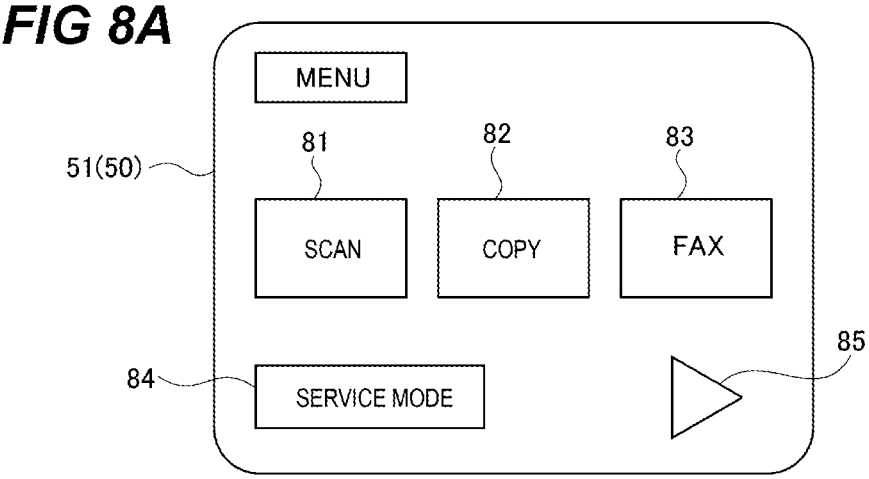
FIGS. 8A to 8C are diagrams showing a screen displayed on a wireless operation unit.
Figure 8B:
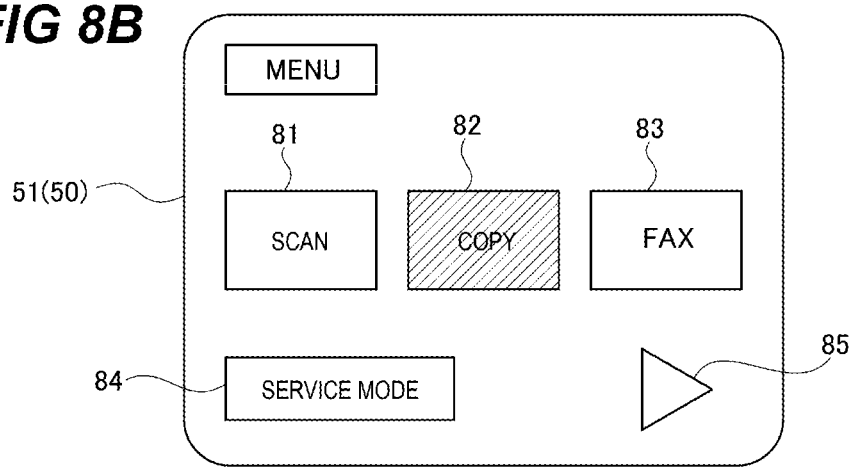
Figure 8C:
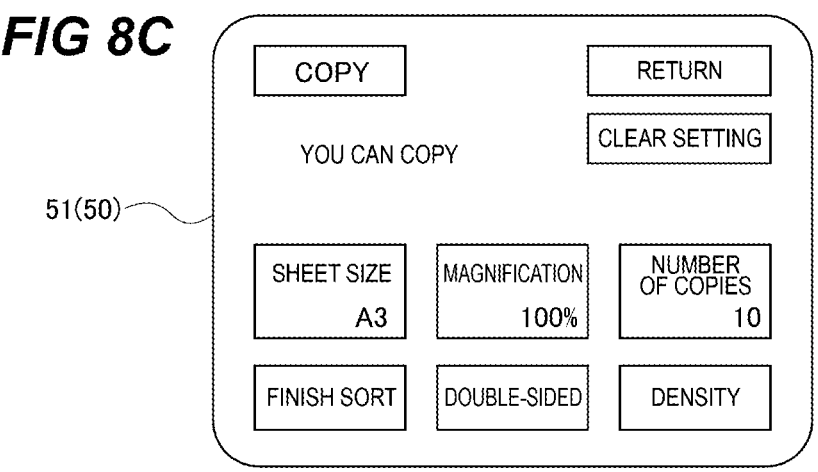
Figure 9A:
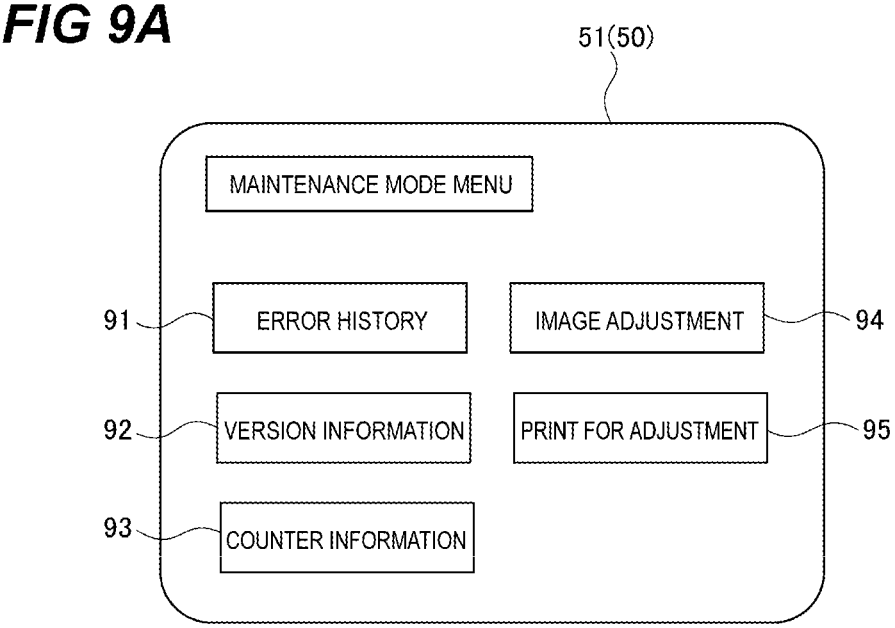
FIGS. 9A and 9B are diagrams showing a screen displayed on a wireless operation unit.

FIGS. 8A, 8B, 8C, and 9A are diagrams showing examples of a screen displayed on the display 51 of the wireless operation unit 50. This screen is a screen displayed in the normal mode, which is a mode in which the user performs printing work. FIGS. 8A, 8B, and 8C show display images (operation screens) displayed on the wireless operation unit 50 in the normal mode, and FIG. 9A shows a display image (operation screen) displayed on the wireless operation unit 50 in the maintenance mode.

FIGS. 8A, 8B, and 8C are examples of a main menu screen in the normal mode. The screen (display image) in the normal mode shown in FIGS. 8A and 8B includes a "SCAN" button 81, a "COPY" button 82, a "FAX" button 83, a "SERVICE MODE" button 84, and a "NEXT" button 85. These buttons are keys for the user to input an instruction to the wireless operation unit 50. In the present embodiment, a touch panel is built in the wireless operation unit 50, so that the user can give a desired instruction to the image forming apparatus 1 by touching these soft keys displayed on the display. However, the wireless operation unit 50 may not have a built-in touch panel, that is, may have only a hard key. In such a form, the above-described "key" means a hard key. In addition, each key (button) displayed on the display 51 is an icon touched to transmit a signal for executing the above-described scan, copy, FAX, and the like from the wireless operation unit 50 to the image forming apparatus 1.

In the normal mode, when the user touches the touch panel 52 of the wireless operation unit 50, the CPU 21 of the controller 20 recognizes the coordinate data described with reference to FIG. 7 through the main body command communication portion 32. For example, FIG. 8A is an example of a main menu screen displayed in the normal mode. When the position touched by the user is the "COPY" button 82 in FIG. 8A, the CPU 61 of the wireless operation unit 50 transmits the operation information of the touch panel 52 to the image forming apparatus 1 as coordinate information. The CPU 21 of the image forming apparatus 1 recognizes that the "COPY" button 82 in FIG. 8A has been pressed from the coordinate information received through the main body command communication portion 32.

Then, the CPU 21 of the image forming apparatus 1 reads the display image of FIG. 8B from the storage device 24, and transmits the read display image of FIG. 8B from the main body image transmission portion 33 to the wireless operation unit 50. The wireless operation unit 50 receives the display image of FIG. 8B through the panel image receiving portion 73 and displays the received display image on the display 51. The display image of FIG. 8B displayed on the display 51 of the wireless operation unit 50 is a display image of the display in which the "COPY" button 82 is pressed.

In addition, the CPU 21 of the controller 20 of the image forming apparatus 1 transmits the display image of FIG. 8C from the main body image transmission portion 33 to the wireless operation unit 50 after a predetermined time has passed from the transmission of the display image of FIG. 8B. The wireless operation unit 50 displays the display image of FIG. 8C on the display 51 through the panel image receiving portion 73.

In this manner, the controller 20 of the image forming apparatus 1 reads the display image from the storage device 24 according to the coordinate data transmitted from the wireless operation unit 50, and transmits the read display image from the main body image transmission portion 33. As a result, a display screen (display image) according to the user's operation can be displayed on the display 51 of the wireless operation unit 50.

FIG. 9A is an example of a maintenance mode menu screen displayed in the maintenance mode. When a repairman performs maintenance work, the repairman shifts the operation mode to the maintenance mode by performing a special operation through the wireless operation unit 50. For example, the repairman inputs an ID and a password through the wireless operation unit 50, or performs a special operation such as long pressing of a key provided in the wireless operation unit 50 or simultaneous pressing of a plurality of keys. As a result, the operation mode of the image forming apparatus 1 is shifted to the maintenance mode.

When the repairman performs the above-described special operation on the wireless operation unit 50, the CPU 61 of the wireless operation unit 50 transmits the operation information to the image forming apparatus 1. The CPU 21 of the image forming apparatus 1 recognizes, from the operation information received through the main body command communication portion 32, that an instruction to shift to the maintenance mode has been given.

Then, the CPU 21 of the image forming apparatus 1 reads the display image of FIG. 9A from the storage device 24, and transmits the read display image of FIG. 9A from the main body image transmission portion 33 to the wireless operation unit 50. The wireless operation unit 50 receives the display image of FIG. 9A through the panel image receiving portion 73 and displays the received display image on the display 51.

On the maintenance mode menu screen shown in FIG. 9A, a button 91 is a button for displaying a history of serious errors that have occurred in the image forming apparatus 1. A button 92 is a button for displaying version information of each program for controlling the image forming apparatus 1. A button 93 is a button for displaying various kinds of counter information, such as the number of sheets printed by the image forming apparatus 1 or the number of sheets transmitted. A button 94 is a button for checking and changing the parameter settings when image distortion or color shift occurs in the image forming apparatus 1. A button 95 is a button for printing a test pattern for image adjustment of the image forming apparatus 1. In addition, the functions of these buttons show examples of the maintenance work, and the maintenance work is not limited to these.

Figure 9B:
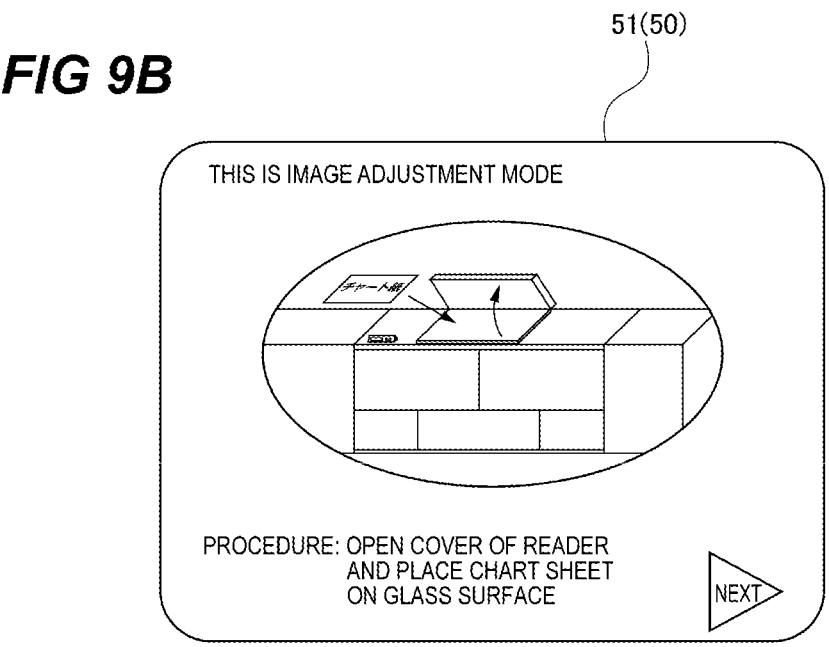

FIG. 9B is a display image displayed on the wireless operation unit 50 when the button 94 is touched on the maintenance mode menu screen shown in FIG. 9A, and shows an example of an image adjustment mode screen. On the image adjustment mode screen shown in FIG. 9B, an instruction to place a chart sheet on the glass surface of the reader is shown. On the display 51 of the wireless operation unit 50, a series of operations of opening the cover of the reader and placing the chart sheet on the glass surface are displayed in an easy-to-understand manner using animation. When the work on the display screen shown in FIG. 9B is completed, a "NEXT" button is pressed to proceed to the next step. The repairman proceeds with the work for image adjustment while looking at the screen displayed on the display of the wireless operation unit 50.

After performing the maintenance work described above, the repairman also performs a special operation on the wireless operation unit 50 when the maintenance mode of the image forming apparatus 1 is canceled. In addition, it is assumed that these operations are special operations that only a repairman can know and are not disclosed to general users.

<Processing Procedure in Maintenance Mode>

Figure 10:
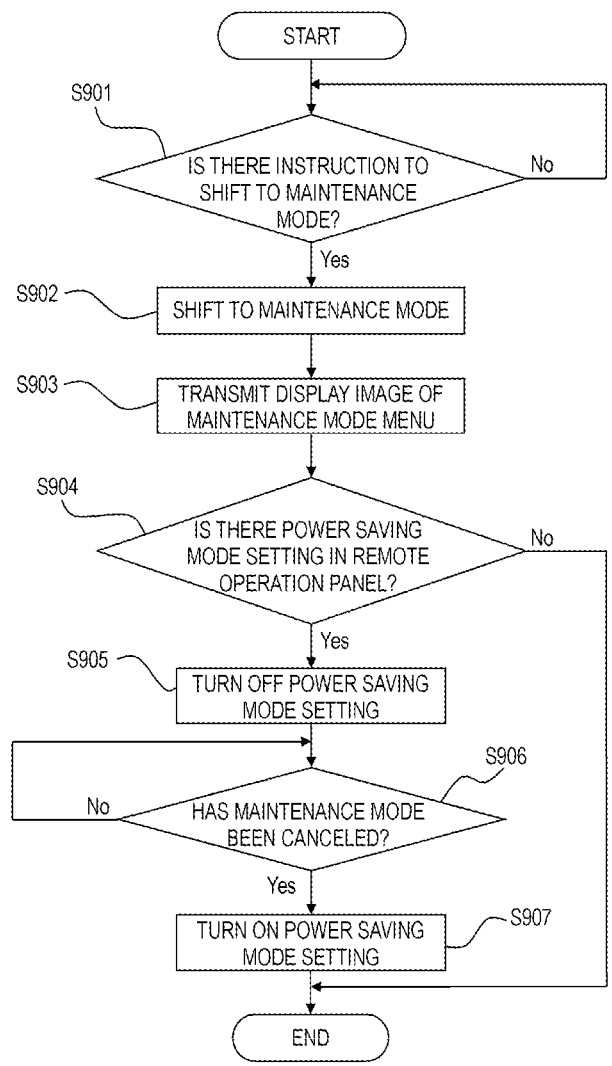
FIG. 10 is a flowchart describing the process flow of an image forming apparatus according to a first embodiment.

FIG. 10 is a flowchart showing an example of a processing procedure when a repairman shifts the image forming apparatus 1 to the maintenance mode.

The processing procedure shown in FIG. 10 starts when a repairman gives an instruction to shift the image forming apparatus 1 to the maintenance mode. In addition, each step shown in FIG. 10 is realized by loading the program 25 stored in the storage device 24 into the memory 22 and executing the program 25 by the CPU 21 shown in FIG. 10.

If a special operation known only to the repairman is performed in the wireless operation unit 50 to shift to the maintenance mode (Yes in S901), the CPU 21 of the controller 20 sets the operation mode of the image forming apparatus 1 to the maintenance mode (S902).

The CPU 21 reads the display image of the maintenance mode menu shown in FIG. 9A from the storage device 24, transmits the read display image from the main body image transmission portion 33 to the wireless operation unit 50, and displays the transmitted display image on the display 51 of the wireless operation unit 50 (S903).

The CPU 21 transmits a command from the main body command communication portion 32 to the wireless operation unit 50, and determines whether or not there is a power saving mode setting in the wireless operation unit 50 (S904).

Whether or not there is a power saving mode setting is checked by checking the setting value of the power saving mode setting flag stored in the ROM 62 (setting storage portion) of the wireless operation unit 50. In addition, the presence or absence of the power saving mode setting is not limited to this. For example, the shift time for shifting to the power saving mode may be set in the wireless operation unit 50, and whether or not the setting value (count value) of the shift time to the power saving mode is 0 (0 minute) may be checked. In this case, if the count value is 0, there is no power saving mode setting, and if the count value is 1 or more, there is a power saving mode setting.

If there is no power saving mode setting (No in S904), the wireless operation unit 50 does not shift to the power saving mode during the display of the maintenance mode, and accordingly, the flowchart of FIG. 10 ends.

If there is a power saving mode setting (Yes in S904), the CPU 21 turns off the power saving mode setting so as not to shift the wireless operation unit 50 to the power saving mode (S905). That is, the CPU 21 changes the power saving mode setting of the ROM 62 so as not to allow the CPU 61 to shift the wireless operation unit 50 to the power saving mode.

Turning off the power saving mode setting means that the CPU 21 sets the setting value of the power saving mode setting flag in the ROM 62 to "0" (or sets the power saving mode shift count value to 0), and means that the CPU 21 changes the power saving mode setting checked in S904. Therefore, the shift of the wireless operation unit 50 to the power saving mode becomes invalid during the maintenance work, so that the wireless operation unit 50 can be prevented from shifting to the power saving mode.

The CPU 21 continues to turn off the power saving mode setting until a predetermined operation for canceling the maintenance mode is performed (No in S906). The predetermined operation for canceling the maintenance mode is a special operation performed through the wireless operation unit 50, which is known only to the repairman.

When a predetermined operation for canceling the maintenance mode is performed in the wireless operation unit 50, the CPU 61 of the wireless operation unit 50 transmits the operation information to the image forming apparatus 1. Then, the CPU 21 of the controller 20 recognizes, from the operation information received through the main body command communication portion 32, that an instruction to cancel the maintenance mode has been given (Yes in S906).

Whether or not the maintenance mode has been canceled in S906 is determined by the CPU 21 determining whether or not the above-described predetermined operation has been performed in the wireless operation unit 50. If the CPU 21 determines that the maintenance mode is to be canceled (Yes in S906), the CPU 21 returns the power saving mode setting of the ROM 62 to ON to enable the shift of the wireless operation unit 50 to the power saving mode (S907).

Turning on the power saving mode setting in S907 means that the CPU 21 returns the setting value (or the power saving mode shift count value) of the power saving mode setting flag of the ROM 62 to the power saving mode setting checked in S904. That is, the CPU 21 returns the power saving mode setting of the ROM 62 to ON so as to allow the CPU 61 to shift the wireless operation unit 50 to the power saving mode, thereby enabling the shift of the wireless operation unit 50 to the power saving mode.

In this manner, the CPU 21 of the image forming apparatus 1 controls whether or not to allow the wireless operation unit 50 to shift to the power saving mode (second mode) in the maintenance mode.

As described above, it is possible to prevent the wireless operation unit 50 from shifting to the power saving mode to interrupt the work during the maintenance work performed by the repairman while looking at the screen of the wireless operation unit 50 in the maintenance mode.

<Display Screen when Error is Detected>

When the image forming apparatus 1 of the present embodiment detects the occurrence of an error in the operation of the image forming apparatus 1, an error notification screen showing the cause of the error occurrence is displayed on the display 51. An example of the error notification screen is shown in FIGS. 11A and 11B.

Figure 11A:
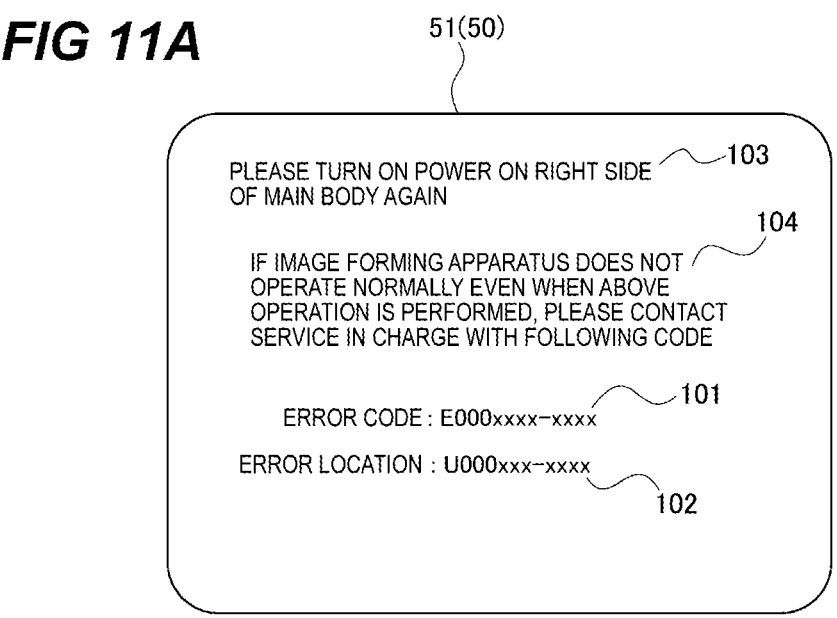
FIGS. 11A and 11B are diagrams showing a screen displayed on a wireless operation unit.

FIG. 11A is an example of the error notification screen for notifying the user of an error that has occurred in the image forming apparatus 1. On the error notification screen in FIG. 11A, an error code 101 indicating the type of error and an error location code 102 indicating the error occurrence location are displayed. In addition, a message 1003 for instructing the user to turn on/off the power is displayed so as to turn on the power of the image forming apparatus 1 again.

After the user turns on the power of the image forming apparatus 1 again based on the message 103, if the image forming apparatus 1 operates normally, for example, the main menu screen shown in FIG. 8A is displayed on the display 51, so that the normal operation can be resumed. On the other hand, if the image forming apparatus 1 does not operate normally even when the power is turned on again, for example, the error notification screen shown in FIG. 11A is displayed again on the display 51, so that the normal operation cannot be resumed. In this case, a message 104 for transmitting error information for specifying the error content to the repairman in charge is also displayed.

Figure 11B:
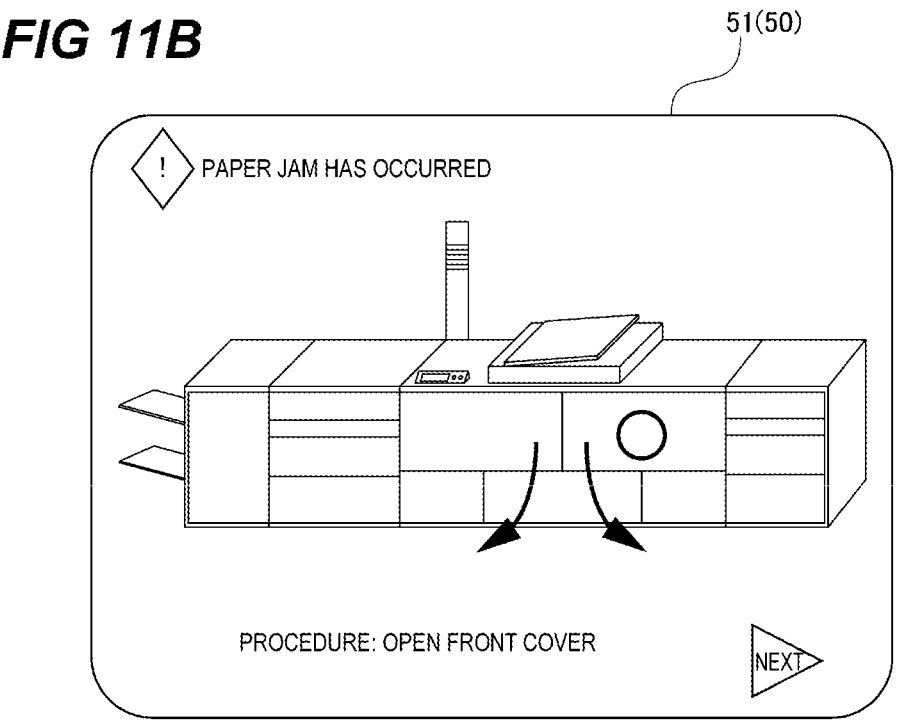

FIG. 11B is an example of the error notification screen for prompting the user to handle a paper jam when the sheet jam (paper jam) occurs in the image forming apparatus 1. On the error notification screen in FIG. 11B, a screen for prompting the user to handle a paper jam when the paper jam occurs during printing is displayed. On the error notification screen in FIG. 11B, the display of the location of a paper jam and a procedure for handling the paper jam are displayed by animation or the like. The repairman proceeds with the work for recovery from the error of paper jam while looking at the screen of the wireless operation unit 50.

<Processing Procedure when Error is Detected>

Figure 12:
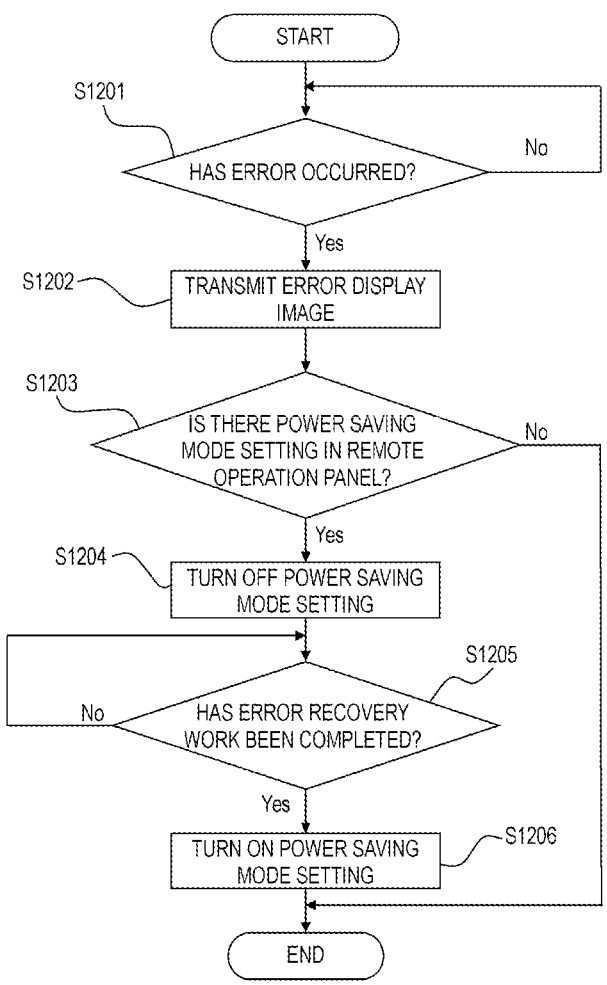
FIG. 12 is a flowchart describing a process flow of the image forming apparatus according to the first embodiment.

FIG. 12 is a flowchart showing an example of a processing procedure when the error display shown in FIG. 11A or the error of paper jam shown in FIG. 11B occurs in the image forming apparatus 1.

The processing procedure shown in FIG. 12 starts when an error is detected in the image forming apparatus 1. In addition, each step shown in FIG. 12 is realized by loading the program 25 stored in the storage device 24 into the memory 22 and executing the program 25 by the CPU 21 shown in FIG. 4.

If the CPU 21 of the image forming apparatus 1 detects that an error has occurred in the operation of the image forming apparatus 1 (Yes in S1201), shift to the mode when the error is detected occurs. Specifically, if the CPU 21 detects that an error has occurred in the image forming apparatus 1 (Yes in S1201), the display image for error notification shown in FIG. 11A or 11B is transmitted from the main body image transmission portion 33 to be displayed on the display 51 of the wireless operation unit 50 (S1202).

The CPU 21 transmits a command from the main body command communication portion 32 to the wireless operation unit 50, and determines whether or not there is a power saving mode setting in the wireless operation unit 50 (S1203).

Whether or not there is a power saving mode setting is checked by checking the setting value of the power saving mode setting flag stored in the ROM 62 (setting storage portion) of the wireless operation unit 50. In addition, the presence or absence of the power saving mode setting is not limited to this. For example, the shift time for shifting to the power saving mode may be set in the wireless operation unit 50, and whether or not the setting value (count value) of the shift time to the power saving mode is 0 (0 minute) may be checked. In this case, if the count value is 0, there is no power saving mode setting, and if the count value is 1 or more, there is a power saving mode setting.

If there is no power saving mode setting (No in S1203), the wireless operation unit 50 does not shift to the power saving mode during the display of error, and accordingly, the flowchart of FIG. 12 ends.

If there is a power saving mode setting (Yes in S1203), the CPU 21 turns off the power saving mode setting so as not to shift the wireless operation unit 50 to the power saving mode (S1204). That is, the CPU 21 changes the power saving mode setting of the ROM 62 so as not to allow the CPU 61 to shift the wireless operation unit 50 to the power saving mode.

Turning off the power saving mode setting means that the CPU 21 sets the setting value of the power saving mode setting flag in the ROM 62 to "0" (or sets the power saving mode shift count value to 0), and means that the CPU 21 changes the power saving mode setting checked in S1204. Therefore, the shift of the wireless operation unit 50 to the power saving mode becomes invalid during the error display, so that the wireless operation unit 50 can be prevented from shifting to the power saving mode.

The CPU 21 continues to turn off the power saving mode setting until the error recovery work is completed (No in S1205).

If the error recovery work is completed (Yes in S1205), the CPU 21 returns the power saving mode setting of the ROM 62 to ON to enable the shift of the wireless operation unit 50 to the power saving mode (S1206).

The completion of the error recovery work in S1205 is, for example, a case where the user ends the recovery process on the paper jam error in FIG. 11B and the CPU 21 determines that the paper jam error has been resolved.

Turning on the power saving mode setting in S1206 means that the CPU 21 returns the setting value (or the power saving mode shift count value) of the power saving mode setting flag of the ROM 62 to the power saving mode setting checked in S1203. That is, the CPU 21 returns the power saving mode setting of the ROM 62 to ON so as to allow the CPU 61 to shift the wireless operation unit 50 to the power saving mode, thereby enabling the shift of the wireless operation unit 50 to the power saving mode.

In this manner, the CPU 21 of the image forming apparatus 1 controls whether or not to allow the wireless operation unit 50 to shift to the power saving mode (second mode) in the mode when the error is detected.

As described above, when it is detected that an error has occurred in the image forming apparatus 1, it is possible to prevent the wireless operation unit 50 from shifting to the power saving mode to interrupt the work during the error recovery work performed while looking at the screen of the wireless operation unit 50.

<Processing Procedure when Shifting to Power Saving Mode>

Figure 13:
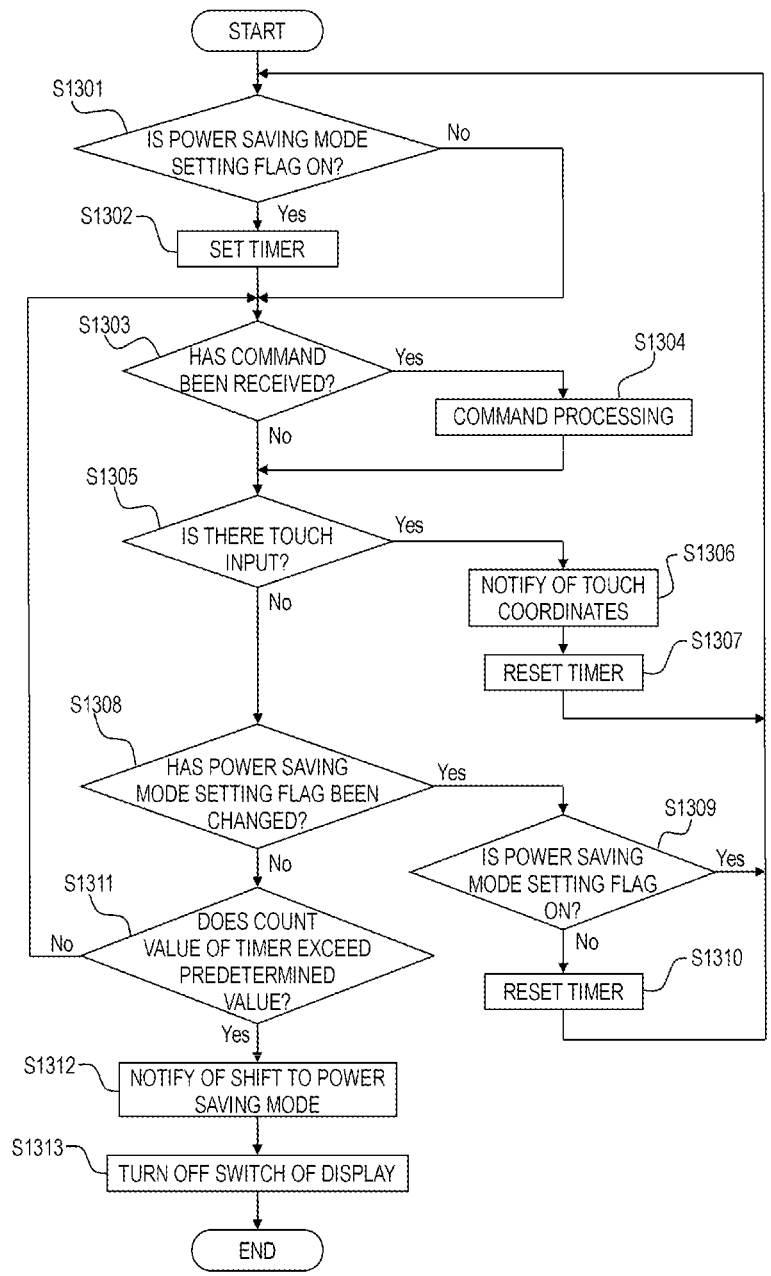
FIG. 13 is a flowchart describing a process flow of the image forming apparatus according to the first embodiment.

FIG. 13 is a flowchart showing an example of a processing procedure when the wireless operation unit 50 shifts to the power saving mode.

The processing procedure shown in FIG. 13 is started by detecting that the wireless operation unit 50 has been removed from the panel mounting portion 10 of the image forming apparatus 1. In addition, each step shown in FIG. 13 is realized by loading the program 25 stored in the storage device 24 into the memory 22 and executing the program 25 by the CPU 21 shown in FIG. 4. In addition, each step shown in FIG. 13 is realized by loading a program stored in the ROM 62 into the RAM 63 and executing the program by the CPU 61 shown in FIG. 5.

The CPU 61 reads the setting value of the power saving mode setting flag stored in the ROM 62, and determines whether the power saving mode setting is ON or OFF (S1301). When the power saving mode setting is ON, the wireless operation unit 50 is allowed to shift to the power saving mode. On the other hand, when the power saving mode setting is OFF, the shift of the wireless operation unit 50 to the power saving mode is not allowed. Therefore, if the power saving mode setting is ON (Yes in S1301), the CPU 61 starts the counting of the timer 64 (S1302). On the other hand, if the power saving mode setting is OFF (No in S1301), the CPU 61 shifts to S1303 without starting the counting of the timer 64.

In S1303, the CPU 61 determines whether or not a command has been received from the image forming apparatus 1. If a command is received (Yes in S1303), the CPU 61 performs processing in the wireless operation unit 50 according to the instruction content of the received command (S1304). For example, the CPU 61 performs predetermined processing on the display 51, the speaker portion 53, and the state display portion 54. Then, the CPU 61 switches the setting value of the power saving mode setting flag as a control for the shift of the wireless operation unit 50 to the power saving mode.

In S1305, the CPU 61 detects whether or not there is a touch input from the touch panel 52. If a touch input is detected (Yes in S1305), the CPU 61 transmits the coordinate information of the touch panel 52 to the main body command communication portion 32 through the panel command communication portion 72 based on the content of the touch input (S1306). The count of the timer 64 is reset (S1307) to proceed to S1301.

When the counting is started in S1302 since there has been a touch input from the touch panel 52, the CPU 61 temporarily clears the count of the timer 64 (S1307), and proceeds to S1301 to start counting from the beginning. In S1301, when the power saving mode setting is OFF, a state in which the counting of the timer 64 is not started continues.

If no touch input is detected in S1305 (No in S1305), the CPU 61 reads the setting value of the power saving mode setting flag stored in the ROM 62 and compares the read setting value with the setting value of the power saving mode setting flag read in S1301 (S1308).

In S1308, the CPU 61 determines whether or not the setting value of the power saving mode setting flag has been changed by the command processing of S1304. If the setting value of the power saving mode setting flag is changed (Yes in S1308), it is determined in S1309 whether the power saving mode setting is ON or OFF.

If the power saving mode setting is ON (Yes in S1309), the CPU 61 proceeds to S1301. If the power saving mode setting is OFF (No in S1309), the CPU 61 clears (resets) the count of the timer 64 (S1310), and then proceeds to S1301.

If the setting value of the power saving mode setting flag is not changed (No in S1308), the count value of the timer 64 is compared with a predetermined value to determine whether or not the count value exceeds the predetermined value (first predetermined time) in S1311.

Here, the predetermined value indicates a count value corresponding to the time specified by the user as a shift time to the power saving mode from the setting screen (not shown) of the display 51, and is stored in the ROM 62 in advance as a power saving mode shift count value.

If the count value does not exceed the predetermined value (No in S1311), the process proceeds to S1303. Thereafter, the timer 64 does not start counting until the setting value of the power saving mode setting flag is changed. The wireless operation unit 50 repeats checking whether or not a command has been received and whether or not there has been a touch input without shifting to the power saving mode.

If the count value exceeds the predetermined value (Yes in S1311), the CPU 61 (second controller) notifies the image forming apparatus 1 through the wireless communication portion 71 that the wireless operation unit 50 shifts to the power saving mode (S1312). The CPU 61 controls the switch 59 (FIG. 5) to be OFF to limit the supply of power to the display 51, thereby shifting the wireless operation unit 50 to the power saving mode (S1313). In addition, "restricting the supply of power" referred to herein means not only completely eliminating the supply of power from the battery 67 to the display 51 but also supplying less power than in the normal mode by reducing the amount of power supplied using an element, such as a variable resistor.

As described above, the image forming apparatus 1 can switch the control for the shift of the wireless operation unit 50 to the power saving mode so that the wireless operation unit 50 does not shift to the power saving mode. As a result, during the maintenance work described with reference to FIG. 10 or when an error occurs as described with reference to FIG. 12, it is possible to prevent the wireless operation unit 50 from shifting to the power saving mode to interrupt the work. That is, it is possible to realize power saving of the wireless operation unit without lowering the workability of the user.

In FIG. 13, the control for resetting the count of the timer 64 started in S1302 when the power saving mode setting is OFF in S1309 has been described. If the power saving mode setting is OFF in S1309, the counting of the timer 64 may be stopped instead of resetting the count of the timer 64. In this case, the command reception (S1303) and the checking of the presence or absence of a touch input (S1305) are repeated in a state in which the counting of the timer 64 is stopped. In S1303, when the power saving mode setting is changed to ON by the received command, the CPU 61 proceeds to S1301 to restart the counting of the timer 64 from the stopped count.

That is, the wireless operation unit 50 (remote operation portion) has the timer 64 that counts a time for shifting from the first mode, in which the power of the battery is supplied to the display 51 (display portion), to the second mode in which the supply of power to the display 51 is restricted. The wireless operation unit 50 has the CPU 61 (second controller) that shifts the wireless operation unit 50 to the second mode when the count of the timer 64 exceeds a predetermined value. Then, the CPU 61 (second controller) stops the counting of the timer 64 when the image forming apparatus 1 shifts to the maintenance mode or when an error is detected in the image forming apparatus 1. Then, when the maintenance mode is canceled or when the error is resolved, the CPU 61 restarts the timer 64 from the stopped count. Even with such a configuration, it is possible to realize power saving of the wireless operation unit without lowering the workability of the user.

In addition, the control for resetting the count of the timer 64, which has been described with reference to FIG. 13, and the control for stopping the counting of the timer 64 as described above can be switched and used by selection in a setting (not shown) on the operation screen of the image forming apparatus 1.

Second Embodiment

In the first embodiment, an example has been described in which the wireless operation unit 50 is not shifted to the power saving mode when the image forming apparatus 1 shifts to the maintenance mode as described with reference to FIG. 10 or when an error occurs as described with reference to FIG. 12.

In the second embodiment, an example of changing the control to shift the wireless operation unit 50 to the power saving mode according to the remaining amount of the battery 67 will be described.

Figure 14:
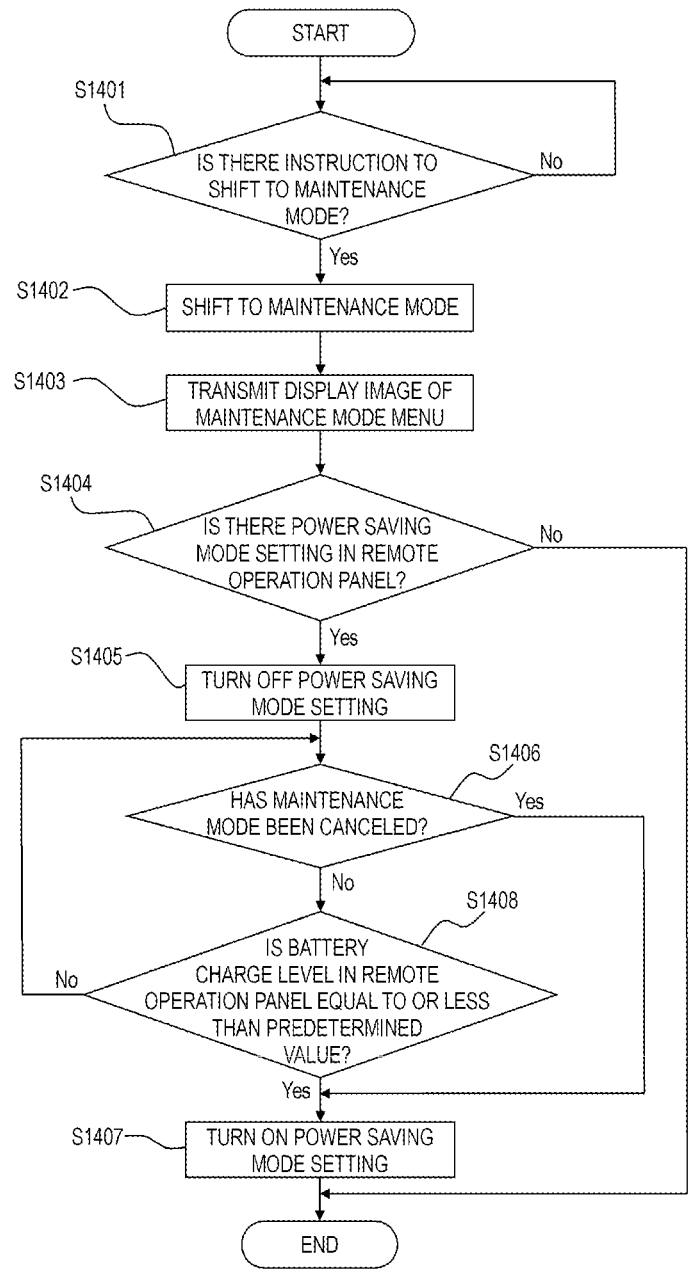
FIG. 14 is a flowchart describing the process flow of an image forming apparatus according to a second embodiment.

FIG. 14 is a flowchart showing an example of a processing procedure when a repairman shifts the image forming apparatus 1 to the maintenance mode in the second embodiment.

The processing procedure shown in FIG. 14 starts when a repairman gives an instruction to shift the image forming apparatus 1 to the maintenance mode. In addition, each step shown in FIG. 14 is realized by loading the program 25 stored in the storage device 24 into the memory 22 and executing the program 25 by the CPU 21 shown in FIG. 4.

Steps S1401 to S1407 are the same as steps S901 to S907 in FIG. 10.

Until a predetermined operation for canceling the maintenance mode is performed in S1406 (No in S1406), the CPU 61 monitors a notification from the charge level monitoring portion 69 to check the remaining amount of the battery 67 in S1408.

In S1408, the CPU 61 determines whether or not the remaining amount of the battery 67 is equal to or less than a predetermined value (for example, 10% or less of the charging capacity).

When the remaining amount of the battery 67 is not equal to or less than the predetermined value (No in S1408), the process proceeds to S1406 to determine whether or not a predetermined operation for canceling the maintenance mode has been performed. When the remaining amount of the battery 67 is equal to or less than the predetermined value (Yes in S1408), the CPU 21 (controller) returns the power saving mode setting to ON, that is, returns to the control to allow the wireless operation unit 50 to shift to the power saving mode, thereby enabling the shift of the wireless operation unit 50 to the power saving mode (S1407).

In this example, when the remaining amount of the battery 67 is equal to or less than the predetermined value, the wireless operation unit 50 immediately shifts to the power saving mode. That is, the wireless operation unit 50 shifts to the power saving mode immediately after proceeding to S1407.

However, after proceeding to S1407, the counting of the timer 64 may be restarted again. In this case, the wireless operation unit 50 shifts to the power saving mode when the count value of the timer 64 exceeds the predetermined value. In the normal mode instead of the maintenance mode, the time (second predetermined time) for shifting to the power saving mode after restarting counting may be the same as the first predetermined time, which is the time until the wireless operation unit 50 shifts to the power saving mode, or may be longer than the first predetermined time.

Here, the repairman is in the process of maintenance during the shift to the maintenance mode, but when the remaining amount of the battery 67 of the wireless operation unit 50 is low, the wireless operation unit 50 can be shifted to the power saving mode.

As a result, it is possible to prevent the work from being interrupted due to the remaining amount of the battery 67 of the wireless operation unit 50 becoming zero during the maintenance work of the repairman.

Alternatively, in order to prevent the work from being interrupted due to the remaining amount of the battery 67 of the wireless operation unit 50 becoming zero during the maintenance work, the remaining amount of the battery may be able to be checked on the operation screen of the maintenance mode.

Figure 15:
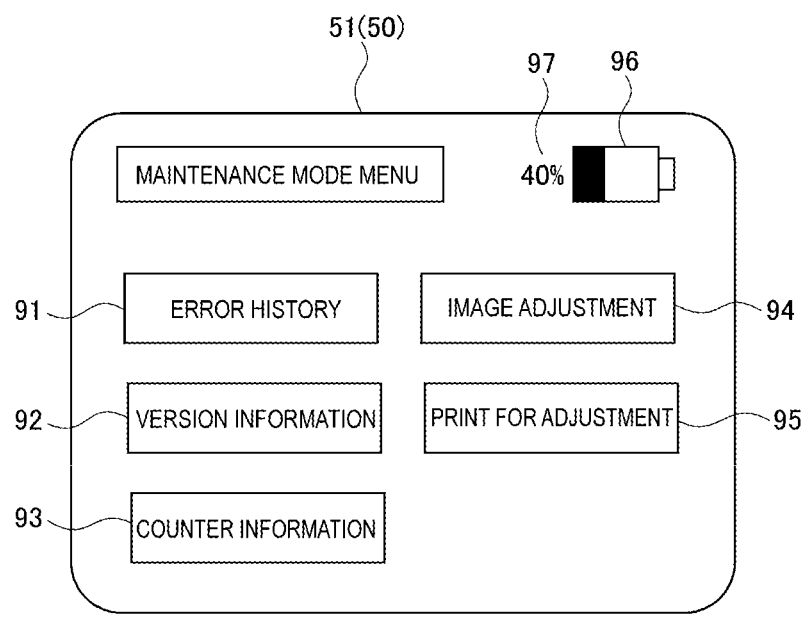
FIG. 15 is a diagram showing an example of a screen displayed on a wireless operation unit according to the second embodiment.

FIG. 15 shows an example of displaying the remaining amount of a battery. In FIG. 15, on the operation screen of the maintenance mode displayed in the wireless operation unit 50, an icon 96 showing the remaining amount of a battery and an icon 97 showing the remaining amount of a battery as a percentage are displayed at the upper right corner.

These icons 96 and 97 may be displayed only in the maintenance mode, or may be displayed in the normal mode as well.

Alternatively, assuming that the predetermined value (10%) is a first predetermined value, the icons 96 and 97 are not displayed when the charge amount is equal to or greater than a second predetermined value (for example, 40% or more) larger than the first predetermined value. Then, when the charge amount of the battery becomes less than the second predetermined value (for example, less than 40%), the icons 96 and 97 may be displayed.

Alternatively, when the charge amount of the battery is equal to or greater than the second predetermined value (for example, 40% or more), small icons may be displayed, and when the charge amount of the battery is less than the second predetermined value (for example, less than 40%), the icons may be enlarged.

Depending on the remaining amount of the battery 67, the control to exit the maintenance mode as shown in FIG. 14 and the display of the battery icon described above may be handled individually or simultaneously.

In addition, FIG. 14 shows an example in which, when the remaining amount of the battery 67 is equal to or less than a predetermined value in S1408, the power saving mode setting is turned on in S1407 in order to enable the wireless operation unit 50 to shift to the power saving mode. In FIG. 14, the power saving mode setting is turned on, and then in FIG. 13, the wireless operation unit 50 is shifted to the power saving mode when the count value of the timer 64 exceeds the predetermined value. When the remaining amount of the battery 67 is equal to or less than the predetermined value, the CPU 61 may immediately shift the panel controller 60 to the power saving mode by a command from the CPU 21. As a result, it is possible to prevent the remaining amount of the battery 67 from becoming zero before shifting to the power saving mode because the predetermined time set by the predetermined value is long.

In addition, in the second embodiment, the case where the shift to the maintenance mode occurs has been described. However, even when an error occurs as shown in FIG. 12, the control for the shift of the wireless operation unit 50 to the power saving mode may be changed according to the remaining amount of the battery 67.

In this case, if the error recovery work is not completed in S1205 of FIG. 12 (No in S1205), the CPU 61 checks the remaining amount of the battery 67 by monitoring the notification of the charge level monitoring portion 69 as in S1408 of FIG. 14.

The CPU 61 determines whether or not the remaining amount of the battery 67 is equal to or less than a predetermined value (for example, 10% of the charging capacity). If the remaining amount of the battery 67 is not equal to or less than the predetermined value, the process proceeds to S1205 to determine whether or not the error recovery work has been completed. When the remaining amount of the battery 67 is equal to or less than the predetermined value, the CPU 21 (controller) proceeds to S1206 to return the power saving mode setting in the ROM 62 to ON, that is, return to the control to allow the wireless operation unit 50 to shift to the power saving mode, thereby enabling the shift of the wireless operation unit 50 to the power saving mode.

As a result, it is possible to prevent the work from being interrupted due to the remaining amount of the battery 67 of the wireless operation unit 50 becoming zero during the error recovery work.

Other Embodiments

In the embodiments described above, when the shift to the maintenance mode occurs as shown in FIG. 10 or when an error occurs as shown in FIG. 12, the power saving mode setting of the ROM 62 is turned off so that the wireless operation unit 50 does not shift to the power saving mode.

The control that does not allow the wireless operation unit 50 to shift to the power saving mode is not limited to the control of changing the power saving mode setting to OFF. For example, the time until the shift to the power saving mode may be changed to a longer time to perform control so as not to substantially allow the shift to the power saving mode. Here, a case will be described in which the setting of the time until the shift to the power saving mode, which is measured by the timer 64 of the wireless operation unit 50, is changed to a longer time.

When the image forming apparatus 1 is in the normal mode, the time until the wireless operation unit 50 shifts to the power saving mode is set as the first predetermined time. Then, when the shift to the maintenance mode occurs as shown in FIG. 10 or when an error occurs as shown in FIG. 12, the setting of the time until the shift to the power saving mode is changed to the second predetermined time longer than the first predetermined time. The second predetermined time longer than the first predetermined time is a shift time that does not affect the maintenance work. For example, the second predetermined time is a work time required for maintenance (one hour is set for one-hour work) or the maximum time that can be set as a power saving mode (two hours is set if the maximum time is two hours).

In addition, both the first predetermined time, which is the time until the shift to the power saving mode, and the second predetermined time can be arbitrarily set by the user or the repairman. At this time, the second predetermined time can be set to a time equal to or longer than the first predetermined time.

As a flowchart for the image forming apparatus 1, in S905 of FIG. 10, instead of controlling the power saving mode setting to be OFF, the CPU 21 transmits a command to the CPU 61 to change the setting of the time until the shift to the power saving mode that is measured by the timer 64. That is, instead of controlling the power saving mode setting to be OFF, the setting of the time until the shift to the power saving mode measured by the timer 64 is changed to the second predetermined time longer than the first predetermined time.

In addition, in S907 of FIG. 10, instead of controlling the power saving mode setting to be ON, the setting of the time until the shift to the power saving mode measured by the timer 64 is returned to the original first predetermined time shorter than the second predetermined time.

In a flowchart for the wireless operation unit 50, steps S1301, S1308, S1309, and S1310 are deleted in FIG. 13. That is, the configuration of the present embodiment does not require a setting storage portion for storing the setting value of the power saving mode setting as compared with the embodiments described above. In addition, changing the setting of the shift time until the shift to the power saving mode measured by the timer 64 may be performed by either the CPU 21 (controller) of the image forming apparatus 1 or the CPU 61 (second controller) of the wireless operation unit 50. When a command for changing the setting of the time until the shift to the power saving mode measured by the timer 64 is received in S1303, the setting time stored in the ROM 62 is changed. The timer 64 is reset to start the counting of the timer 64 with the new time setting.

As described above, the time required to shift to the power saving mode can be extended. Therefore, it is possible to obtain substantially the same effect as when the wireless operation unit 50 is not shifted to the power saving mode. As a result, it is possible to prevent the display of the wireless operation unit 50 from disappearing to interrupt the work during the maintenance work or when an error occurs. That is, it is possible to realize power saving of the wireless operation unit without lowering the workability of the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-040341, filed Mar. 12, 2021, which is hereby incorporated by reference herein in its entirety.

What is claimed is:

1. An image forming apparatus that operates in a normal mode for a user to perform a printing work and a maintenance mode for a repairman to perform a maintenance work, the image forming apparatus comprising:
   an image forming unit configured to form an image on a sheet;

a wireless communication unit configured to perform wireless communication; and a wireless operation unit configured to perform wireless communication with the wireless communication unit, operated to control the image forming apparatus, and including a key configured to input an instruction, a display configured to display information, and a battery configured to supply power for operating the wireless operation unit, the wireless operation unit shifting from a first mode, which is a state in which the display is ON, to a second mode, which is a state in which the display is OFF and in which less power is consumed than in the first mode, wherein, in the normal mode, when the key is not operated for a first predetermined time in the first mode, the wireless operation unit shifts to the second mode, and in the maintenance mode, even if the key is not operated for the first predetermined time in the first mode, the wireless operation unit does not shift to the second mode, wherein, in the maintenance mode, if a remaining amount of the battery is equal to or greater than a predetermined amount in the first mode, the wireless operation unit does not shift to the second mode regardless of a length of a period during which the key is not operated, and if the remaining amount of the battery is less than the predetermined amount, the wireless operation unit shifts to the second mode when the key is not operated for a second predetermined time not shorter than the first predetermined time, and wherein the predetermined amount is larger than the remaining amount of the battery at which the wireless operation unit does not operate.

2. The image forming apparatus according to claim 1, wherein the second predetermined time is the same as the first predetermined time.

3. The image forming apparatus according to claim 1, wherein the second predetermined time is longer than the first predetermined time.

4. The image forming apparatus according to claim 1, further comprising:

a timer configured to count a period during which the wireless operation unit is not operated, wherein, when the image forming apparatus is in the maintenance mode and the remaining amount of the battery is equal to or greater than the predetermined amount, the timer temporarily stops the counting when the period during which the wireless operation unit is not operated becomes longer than the first predetermined time.

5. The image forming apparatus according to claim 4, wherein, when the image forming apparatus is in the maintenance mode and the remaining amount of the battery is equal to or greater than the predetermined amount, the timer restarts the counting when the remaining amount of the battery becomes less than the predetermined amount after the period during which the wireless operation unit is not operated becomes longer than the first predetermined time.

6. The image forming apparatus according to claim 4, wherein the timer is provided in the wireless operation unit.

7. The image forming apparatus according to claim 1, wherein the wireless operation unit includes a touch panel configured to receive touch operations of a user and a repairman, and the display displays the key in the normal mode.

8. The image forming apparatus according to claim 7, wherein the key displayed on the display is an icon touched to transmit a signal for causing the image forming unit to form an image from the wireless operation unit to the image forming apparatus.

9. The image forming apparatus according to claim 1, wherein the maintenance mode is a mode for adjusting a color tone of an output image.

* * * * *